(12) United States Patent
Robinson

(10) Patent No.: US 8,577,183 B2
(45) Date of Patent: Nov. 5, 2013

(54) RESOLUTION ON DEMAND

(75) Inventor: Ian S. Robinson, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 1127 days.

(21) Appl. No.: 12/536,434

(22) Filed: Aug. 5, 2009

(65) Prior Publication Data

US 2011/0033129 A1  Feb. 10, 2011

(51) Int. Cl.
*G06K 9/32* (2006.01)
*G06K 9/36* (2006.01)
*G06K 9/38* (2006.01)
*H04N 5/30* (2006.01)
*H04N 5/335* (2011.01)

(52) U.S. Cl.
USPC ........... 382/299; 382/270; 382/272; 382/276; 382/284; 348/162

(58) Field of Classification Search
CPC ................................ G06K 9/38; G06T 3/4038
USPC ........... 382/270, 272, 276, 284, 299; 348/162
See application file for complete search history.

(56) References Cited

U.S. PATENT DOCUMENTS

| | | | |
|---|---|---|---|
| 4,497,065 A * | 1/1985 | Tisdale et al. | 382/103 |
| 6,373,055 B1 * | 4/2002 | Kerr | 250/330 |
| 6,972,714 B1 * | 12/2005 | Baharav et al. | 342/179 |
| 8,167,483 B2 * | 5/2012 | Jensen | 374/120 |
| 8,290,301 B2 * | 10/2012 | Robinson | 382/284 |
| 2004/0257447 A1 * | 12/2004 | Ohsawa et al. | 348/207.99 |
| 2005/0074221 A1 | 4/2005 | Remillard et al. | |
| 2005/0270220 A1 | 12/2005 | Baharav et al. | |
| 2007/0221849 A1 | 9/2007 | Tabirian et al. | |
| 2007/0258325 A1 | 11/2007 | Grasmueck | |

FOREIGN PATENT DOCUMENTS

EP   1 722 552 A2   11/2006
FR   2 741 722       5/1997

OTHER PUBLICATIONS

Mayer et al., "Detection of Camouflaged Targets in Cluttered Backgrounds using Fusion of Near Simultaneous and Polarimetric Imaging", Naval Research Lab, Sensors and Data Analysis Section, Wash. DC, Aug. 2000, 17 pages.*

(Continued)

*Primary Examiner* — Vikkram Bali
*Assistant Examiner* — Jose M Torres
(74) *Attorney, Agent, or Firm* — Christie, Parker & Hale, LLP

(57) ABSTRACT

A method samples a first spectral band to obtain an initial image frame, determines at least one region of interest of the scene from the initial image frame, each of the at least one region of interest associated with a mean signal level, illuminates the at least one region of interest with at least one illuminator when the mean signal level of the at least one region of interest is at or below a respective threshold of a first plurality of thresholds, the at least one region of interest being illuminated in accordance with a power threshold indicating a minimum illuminator power and agility necessary to illuminate the at least one region of interest, collects at least one image frame in at least one sub-band of a second spectral band, and generates at least one image to be displayed from at least the at least one image frame.

51 Claims, 8 Drawing Sheets

(56) References Cited

OTHER PUBLICATIONS

Written Opinion of the International Searching Authority for International Application No. PCT/US2010/023403, filed Feb. 5, 2010, Written Opinion dated Oct. 20, 2010 and mailed Nov. 2, 2010 (11 pgs.).
International Search Report for International Application No. PCT/US2010/023403, filed Feb. 5, 2010, International Search Report dated Oct. 20, 2010 and mailed Nov. 2, 2010 (6 pgs.).
Battaglia, et al., "High Speed Short Wave Infrared (SWIR) Imaging and Range Gating Cameras", Thermosense XXIX, Proceedings of SPIE, vol. 6541, 645106, 2007, pp. 645106-1-645106-12, XP040239463 pp. 654106-3.
Petrovic, et al., "Objectively Adaptive Image Fusion", Information Fusion, Elsevier, vol. 8, Feb. 1, 2007 (pp. 168-176).
Liu, et al., "Scheduling Algorithms for Multiprogramming in a Hard-Real-Time Environment", Journal of the Association for Computing Machinery, vol. 20, No. 1, Jan. 1973 (pp. 46-61).

* cited by examiner

RESOLUTION ON DEMAND

BACKGROUND

1. Field of the Invention

The present invention relates to an imaging system and method for providing resolution on demand.

2. Description of Related Art

Imaging systems have been widely used to image objects at long distances using telescopes sensitive to various portions of the spectrum.

A fundamental issue regarding such imaging systems is obtaining high-resolution imagery. Resolution may be expensive to obtain or dangerous to collect, requiring large telescopes and/or close proximity to a potential threat. Generally, imaging systems attempt to provide the best spatial resolution possible given the inherent limitations of imaging optics and receiver technology. The spatial resolution inherent to an image collected by a given size telescope (e.g., based on aperture size) is determined by several factors including the wavelength of collected radiation, the dimensions of other apertures in the collection system including pixel aperture, geometric aberrations of the optical system, the spatial sampling of the image, and the stability of the collector's line of sight during image collections. Motion of the elements within the scene can cause smear, reducing the resolution of those elements unless the motion is captured in a fashion that improves how the object is sampled.

Various prior art systems have been designed to obtain imagery under different illumination conditions, including the daytime and nighttime. Obtaining high-resolution imagery generally requires collecting well-sampled imagery at the shortest wavelengths of radiation possible. Prior art systems, for example, collect imagery in the daytime at spatial resolutions of inches to meters. These prior art systems utilize visible (VIS), near infrared (NIR) and medium-wave infrared (MWIR) (both reflective and thermal) regions of the spectrum to obtain daytime imagery. Prior art systems collect imagery at much lower spatial resolutions at nighttime than in daytime, by approximately a factor of 4-7 compared to daytime systems. Such prior art systems generally obtain imagery at night using MWIR (3.0 µm to 5.0 µm) and long-wave infrared (LWIR) (8.0 µm to 12.0 µm) sensors that primarily measure the thermal emissions of ambient scenes. Other prior art systems collect nighttime imagery from reflective VIS (0.4 µm to 0.7 µm), NIR (0.7 µm to 1.0 µm) and lower short-wave infrared (LSWIR) (1.0 to 2.0 µm) bands of the spectrum. A few prior art systems have obtained images of extremely hot or combusting objects at nighttime utilizing the panchromatic (PAN) (1.0 µm to 1.7 µm) and/or the LSWIR bands of the spectrum. However, images collected in the PAN waveband use intensifiers and/or designs with large pixels and are generally low in resolution. Resolution is a measure of being able to separate two or more objects in an image or to recognize an edge. Those skilled in the art recognize there is an inherent limitation to resolution for a given size telescope due to diffraction effects, though many imaging systems purposely degrade their resolution to enable wider area coverage or greater signal collection. A high-resolution image, for example, is one where diffraction effects are the collecting dominant limitation to resolution.

Common knowledge instructs those skilled in the art to create sensors and systems sensitive to wavebands wherein one may find the greatest amount of useful energy to collect imagery at useful signal to noise ratios given the noise inherent to focal plane arrays and readout electronics. Accordingly, most prior art systems have focused on the VIS, NIR, MWIR, LWIR and LSWIR band to obtain imagery. These systems have generally taken advantage of the fact that more photons are available to impinge on sensors sensitive to these wavebands over other wavebands in the spectrum. Recently, prior art systems have been able to take advantage of airglow (e.g., chemiluminesence of the atmosphere) or moonglow (e.g., reflection of moonlight) to obtain degraded resolution images of distant objects.

In addition, common knowledge instructs those skilled in the art to create sensors and systems sensitive to the shortest wavelength possible while still being able to find sufficient useful energy to collect imagery. Finally, common knowledge instructs those skilled in the art to create sensors and systems where the atmosphere is transmissive at certain wavebands in the spectrum.

The upper short-wave infrared (USWIR, 2.0-2.6 um) waveband has not been widely used at night for imaging distant objects. Astronomy programs have used USWIR for study of distant stars and earth resource sensors have imaged the Earth in this band during the daytime. These long-range telescopes are generally required to be fixed on the distant object for great lengths of time to collect enough energy to obtain an image. In addition, the USWIR waveband has generally not been considered suitable for high-resolution imaging at night as only very warm objects may be viewed at night unless a system has very degraded spatial resolution relative to the diffraction limit or collects energy for extensive (non-practical) periods of time. Consequently, it has been primarily used for viewing combusting objects such as rocket plumes or for directly viewing man-made light sources.

Generally, the spectrum is categorized in terms of wavelengths, as may be seen from the values for each of the various wavebands. The LSWIR waveband, for instance, consists of wavelengths shorter than those of the USWIR waveband. In addition, as each of their names suggests, the LWIR, the MWIR, the USWIR and the LSWIR consist of wavelengths in the infrared part of the spectrum. The wavelengths decrease in length as one moves from the LWIR successively to the LSWIR part of the infrared spectrum.

A few prior art systems have combined data from two or more focal plane arrays to generate composite images. For example, a recent system describes combining image frames from one or more sub-bands to generate composite images. However, these systems do not combine illuminated and non-illuminated image frames, or adapt to ambient atmospheric or spectral conditions by using illuminators.

SUMMARY OF THE INVENTION

Exemplary embodiments according to the present invention provide an imaging system and method for providing resolution on demand. The imaging system and method for providing resolution on demand herein provide high-resolution imagery that measures upwelling radiance and adapts sensor settings to collect high-resolution imagery if there is ample upwelling radiance and/or illuminates regions of interest to provide sufficient illumination if there is insufficient upwelling radiance. The imaging system and method therefore adapt to the amount of upwelling radiance and provide additional illumination to regions of interest where that ambient level is insufficient to collect higher resolution imagery than would be possible without the illumination. The imaging system and method further provide fused imagery including image frames collected without illumination and image frames that are collected using illumination.

According to an exemplary embodiment of the present invention, there is provided a method of providing an image of a scene utilizing imaging optics. Radiation from the scene impinges on at least one focal plane. The method samples a first spectral band to obtain an initial image frame. The method then determines at least one region of interest of the scene from the initial image frame. Each of the at least one region of interest is associated with a mean signal level. The method then illuminates the at least one region of interest with at least one illuminator when the mean signal level of the at least one region of interest is at or below a respective threshold of a first plurality of thresholds. The at least one region of interest is illuminated in accordance with a power threshold indicating a minimum illuminator power and agility necessary to illuminate the at least one region of interest. The method then collects at least one illuminated image frame in at least a second spectral band, and generates at least one image to be displayed from at least the at least one illuminated image frame.

The method may further sample the second spectral band to obtain a second band mean signal level, and collect at least one second band image frame when the second band mean signal level is at or below a third threshold. When the second band mean signal level is above the third threshold, the method may further sample sub-bands in the second spectral band to obtain mean signal levels for each of the sub-bands, and collect at least one image frame in each of the sampled sub-bands for which the corresponding mean signal level is above a fourth threshold.

The method may further determine a first band mean signal level from the initial image frame. When the first band mean signal level is above a first threshold, the method may further sample successively narrower sub-bands in the first spectral band to obtain mean signal levels for each of the successively narrower sub-bands until at least one of the mean signal levels each corresponding to one of the successively narrower sub-bands is at or below a respective threshold of a second plurality of thresholds, and collect at least one image frame in each of the sampled sub-bands for which the corresponding mean signal level is above the respective threshold of the second plurality of thresholds.

The method may further adjust the imaging optics until a threshold signal level or a threshold edge contrast ratio has been reached.

The imaging optics may be adjusted until the threshold signal level or the threshold edge contrast ratio has been reached with respect to at least one sub-band of the first and second spectral bands.

The imaging optics may be adjusted by increasing or decreasing a focal length of the imaging optics to increase effective Q, where $$Q = \frac{\lambda F}{\#P_m},$$

and $\lambda$=wavelength, D=telescope diameter, and $P_m$=metric pixel pitch.

The method may further correct geometric aberrations caused by telescope errors or pointing motion when Q is greater than 2.

The method may further determine at least one sub-region of the at least one region of interest to be illuminated from the at least one image frame collected in the second spectral band when the at least one image frame collected in the second spectral band has been illuminated using a first illuminator of the at least one illuminator, illuminate the at least one sub-region with at least one illuminator other than the first illuminator. The at least one illuminator other than the first illuminator may operate at a wavelength smaller than the first illuminator. The method may further collect at least one image frame in the at least one sub-region in at least a sub-band of the second spectral band.

According to another exemplary embodiment in accordance with the present invention, there is provided an imaging system including at least one focal plane for providing images of a scene, a spectral selector for transmitting a first spectral band, a second spectral band or portions thereof to the at least one focal plane, at least one illuminator for illuminating at least one region of interest of the scene, a cueing controller, and a data combiner for generating at least one image to be displayed from at least the at least one illuminated image frame. The cueing controller is configured for sampling a first spectral band to obtain an initial image frame, determining at least one region of interest of the scene from the initial image frame, each of the at least one region of interest associated with a mean signal level, illuminating the at least one region of interest with at least one illuminator when the mean signal level of the at least one region of interest is at or below a respective threshold of a first plurality of thresholds, the at least one region of interest being illuminated in accordance with a power threshold indicating a minimum illuminator power and agility necessary to illuminate the at least one region of interest, and collecting at least one illuminated image frame in at least a second spectral band.

The cueing controller may further sample the second spectral band to obtain a second band mean signal level, collect at least one second band image frame when the second band mean signal level is at or below a third threshold, when the second band mean signal level is above the third threshold, sample sub-bands in the second spectral band to obtain mean signal levels for each of the sub-bands, and collect at least one image frame in each of the sampled sub-bands for which the corresponding mean signal level is above a fourth threshold.

The cueing controller may further determine a first band mean signal level from the initial image frame. When the first band mean signal level is above a first threshold, the cueing controller may further sample successively narrower sub-bands in the first spectral band to obtain mean signal levels for each of the successively narrower sub-bands until at least one of the mean signal levels each corresponding to one of the successively narrower sub-bands is at or below a respective threshold of a second plurality of thresholds. The cueing controller may further collect at least one image frame in each of the sampled sub-bands for which the corresponding mean signal level is above the respective threshold of the second plurality of thresholds.

The cueing controller may further determine an optimal path to illuminate the at least one region of interest based on a prioritized scheduling algorithm, and command the at least one illuminator to illuminate the at least one region of interest in accordance with the optimal path.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein.

DETAILED DESCRIPTION

The present invention will now be described more fully with reference to the accompanying drawings, in which exemplary embodiments thereof are shown. The invention may, however, be embodied in many different forms and should not be construed as being limited to the embodiments set forth herein. Rather, these embodiments are provided so that this disclosure is thorough and complete, and will fully convey the concept of the present invention to those skilled in the art.

Accordingly, there is presented an imaging system and method for providing resolution on demand. In an exemplary embodiment, the imaging system and method herein provide high-resolution imagery that measures upwelling radiance and adapts sensor settings to collect high-resolution imagery if there is ample upwelling radiance and/or illuminates regions of interest to provide sufficient illumination if there is insufficient upwelling radiance. The imaging system and method therefore adapt to the amount of upwelling radiance and provide additional illumination to regions of interest where that ambient level is insufficient to collect higher resolution imagery than would be possible without the illumination. The imaging system and method further provides fused imagery including image frames collected without illumination and image frames that are collected using illumination.

Figure 1:
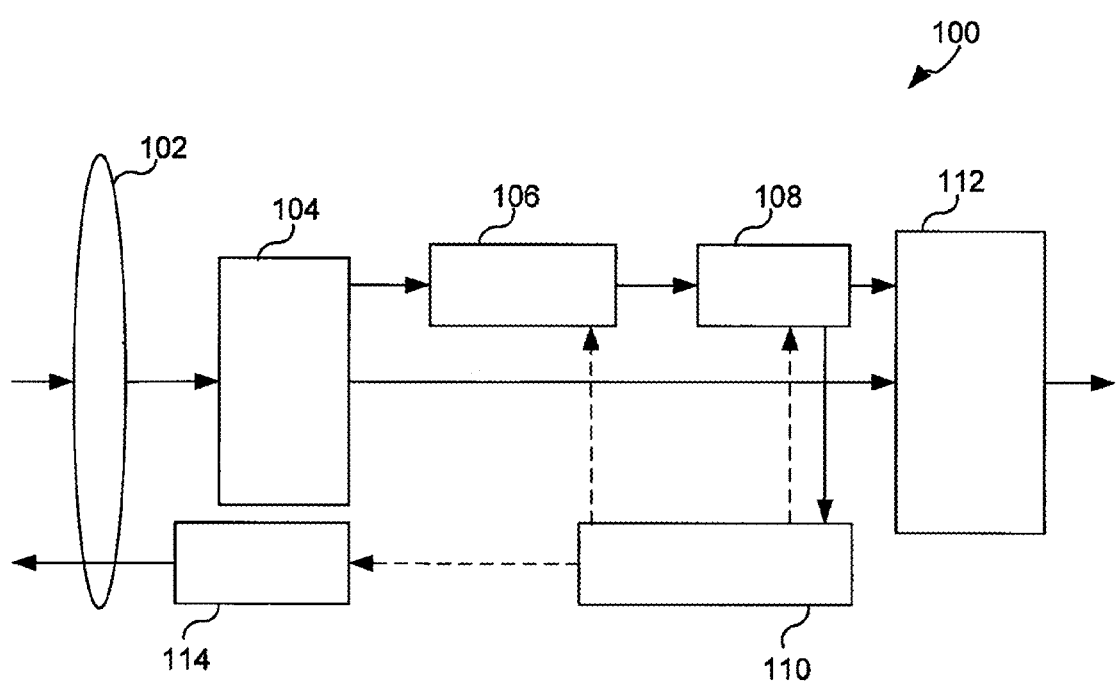
FIG. 1 is a schematic block diagram of an imaging system for providing resolution on demand in accordance with a first embodiment of the present invention.

FIG. 1 is a schematic block diagram of an imaging system for providing resolution on demand in accordance with a first embodiment of the present invention.

Referring now to FIG. 1, the imaging system for providing resolution on demand in accordance with the first embodiment includes an opto-mechanical imaging system 102, a spectral selector 104, a focal plane 106, a readout buffer 108, a cueing controller 110, a data combiner 112, and an illuminator 114.

The opto-mechanical imaging system 102 receives and relays upwelling radiation from a scene to the spectral selector 104. One of ordinary skill in the art would understand that the opto-mechanical imaging system 102 may be implemented in various ways, using materials and components based on the system's requirements. For example, the materials and components of the opto-mechanical imaging system 102 may be suitable to receive and relay upwelling radiation in the UV, VIS, NIR, PAN, MWIR, LWIR, LSWIR and/or USWIR wavebands of the spectrum (e.g., approximately 0.2 µm to 5.0 µm), or any other bands suitable to receive useful imagery. In other embodiments, the opto-mechanical imaging system 102 may be suitable to receive and relay upwelling radiation wavebands below 0.2 µm and above 5.0 µm. One of ordinary skill in the art would recognize that the availability of portions of the spectrum is dependent upon various conditions, including atmospheric conditions. For example, a waveband from about 0.2 to 0.3 would appear opaque when attempting to collect images through the upper atmosphere of the Earth, namely, the solar blind UV portion of the spectrum.

The spectral selector 104, for example, includes a dichroic beam splitter, configured to send all light with wavelengths above a specific threshold to the focal plane 106 (e.g., above 1.0 µm). The spectral selector 104 may further comprise a second level spectral selector for the focal plane 106 including an open position, a MWIR filter, a LWIR filter, a LSWIR filter, a USWIR filter, a UV filter, a PAN filter, and red, green and blue filters. For example, the MWIR filter is centered near 4 µm, the LWIR filter is centered near 10 µm, the LSWIR filter is centered near 1.6 µm, the USWIR filter is centered near 2.3 µm, the UV filter is centered near 0.35 µm, and the PAN filter covers approximately 0.5 to 0.9 µm. Accordingly, the spectral selector 104 divides the open band upwelling radiation into bands and sub-bands.

The focal plane 106, for example, comprises an array of mercury cadmium telluride (MCT) detectors arranged as a focal plane array. In other embodiments, the focal plane 106 comprises an array of indium antimonide (InSb) detectors arranged as a focal plane array or any other array of detectors sensitive to detect imagery in a desired bandwidth of approximately 0.2 µm to 5.0 µm. The MCT detectors typically have about a 10-20 micron metric pitch.

Figure 2:
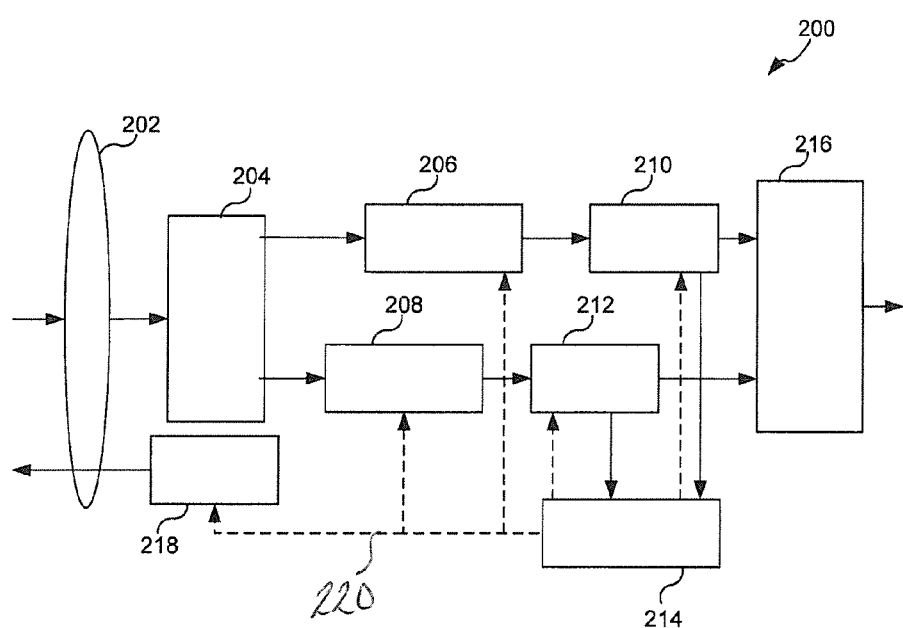
FIG. 2 is a schematic block diagram of an imaging system for providing resolution on demand in accordance with a second embodiment of the present invention.

The imaging system 100 for providing resolution on demand is not limited to one focal plane, however, but may include two or more focal plane arrays (e.g., FIG. 2). One of ordinary skill in the art would understand that the determination of the number of focal plane arrays and their sensitivity to wavelengths is a system design choice and may vary depending on the system's requirements. In other embodiments, the arrangement of focal planes may be sensitive to wavelengths shorter than 0.2 µm or longer than 5.0 µm.

The focal plane 106, for example, provides either a diffraction-limited optical blur or a point-spread function. The focal plane 106 samples its point spread function with a high Q, described by the following equation:

$$Q = \frac{\lambda F/\#}{P_m},$$

where $\lambda$ is the center wavelength, F/# is the focal ratio of the telescope, and $P_m$ is metric pixel pitch. A high Q, for example, is greater than or equal to 0.5. The optical imaging system 100, for example, has a Q=1 at 1.6 um, Q≈1.5 at 2.3 um, Q=1 at 400 nm and Q=2 at 800 nm. Therefore, at a 20 km range from the sensor, the ground sample distance of the optical imaging system 100 is 11 cm for the first focal plane (e.g., the MCT array) and less than 3 cm for the second focal plane 108 (e.g., the CCD array). One of ordinary skill in the art would understand that Q may also be described in terms of pixel pitch in angle $\theta$ ($P_\theta$).

The readout buffer 108 receives signals representing the scene being imaged from the focal plane 106, and buffers and transmits this data to the data combiner 112. Those skilled in the art would recognize that the focal plane 106 generates analog signals that are digitized for storage and processing and that calibration coefficients are generally applied to the images to provide correct radiometric units. The digitization and calibration functions are not shown. The readout buffer 108 formats and stores one or more image frames from the focal plane 106. The readout buffer 108 is also coupled to the cueing controller 110 and provides feedback data thereto. For example, the readout buffer 108 reads out image frames at a rate of thirty frames per second. The readout buffer 108 may also read out frames from the focal plane 106 in both fast and slow read modes. For frame rates less than 10 frames per second (fps), the slow mode is used and generates about 5 e– read noise per read. For frame rates at or about 60 fps, the fast mode is used and generates about 30 e– read noise per read. The readout for the focal plane 106 may be non-destructive or may be reset, as is determined by the cueing controller 110.

The cueing controller 110 is coupled to the focal plane 106, the readout buffer 108 and the illuminator 114. The cueing controller 110 senses the ambient signal levels on selected frames in the open filter positions and then sets the frame rate and integration time of the focal plane 106 as well as the spectral band of each selector to optimize spatial resolution at a minimum signal to noise ratio. For specific wavebands, however, such as the MWIR band, the cueing controller 110 does not need to sense ambient signal levels before setting the frame rate and integration time of the focal plane 106. The cueing controller 110 may be preset (or alternatively, set by the system user) to optimize spatial resolution, signal to noise ratio, frame rate, and/or other image quality factors. The imaging system 100 may sense the upwelling radiance on a scene or any subset of pixels in a selected spectral band while using a short integration with non-destructive readouts. In other words, if there is sufficient signal to warrant additional collection after sampling the upwelling radiation, then the photons collected during the sampling interval contribute towards the final signal to noise level.

Referring still to the cueing controller 110 in FIG. 1, the cueing controller 110 controls operation of the illuminator 114. For example, the illuminator 114 is a laser or multiple lasers at different wavelengths. The illuminator 114 illuminates regions of interest of the scene to provide additional signal level at shorter wavelengths to improve spatial resolution at a minimum signal to noise ratio. In other words, the illuminator 114 illuminates each of the regions of interest that do not have sufficient ambient signal level to generate a useful image frame. For example, the ambient signal level is compared with a respective threshold of a plurality of thresholds (for each of the regions of interest) and the cueing controller 110 commands the illuminator 114 to illuminate the regions of interest that are at or below the corresponding threshold. As is described in greater detail with respect to a third embodiment illustrated in FIG. 3, the cueing controller 110 generates the most efficient schedule for illuminating the regions of interest based on a prioritized scheduling algorithm (not shown in FIG. 3 but described in the section of the detailed description of FIG. 3). In addition, the cueing controller may balance available collection time and illuminator power based on ambient light levels and may direct frame rate and spectral filter selection to collect imagery using the shortest wavelengths given the available signal. For example, a laser operating at 2.3 μm may have a typical spatial extent of 50-m diameter circles as projected on the scene. An illuminator operating with an average power of 150 W may transmit either quasi-CW or pulse (e.g., 10 ms or less) duration to "freeze" moving objects. One of ordinary skill in the art would understand that power levels may be scaled up or down depending on the desired number of regions of interest and their size.

Figure 3:
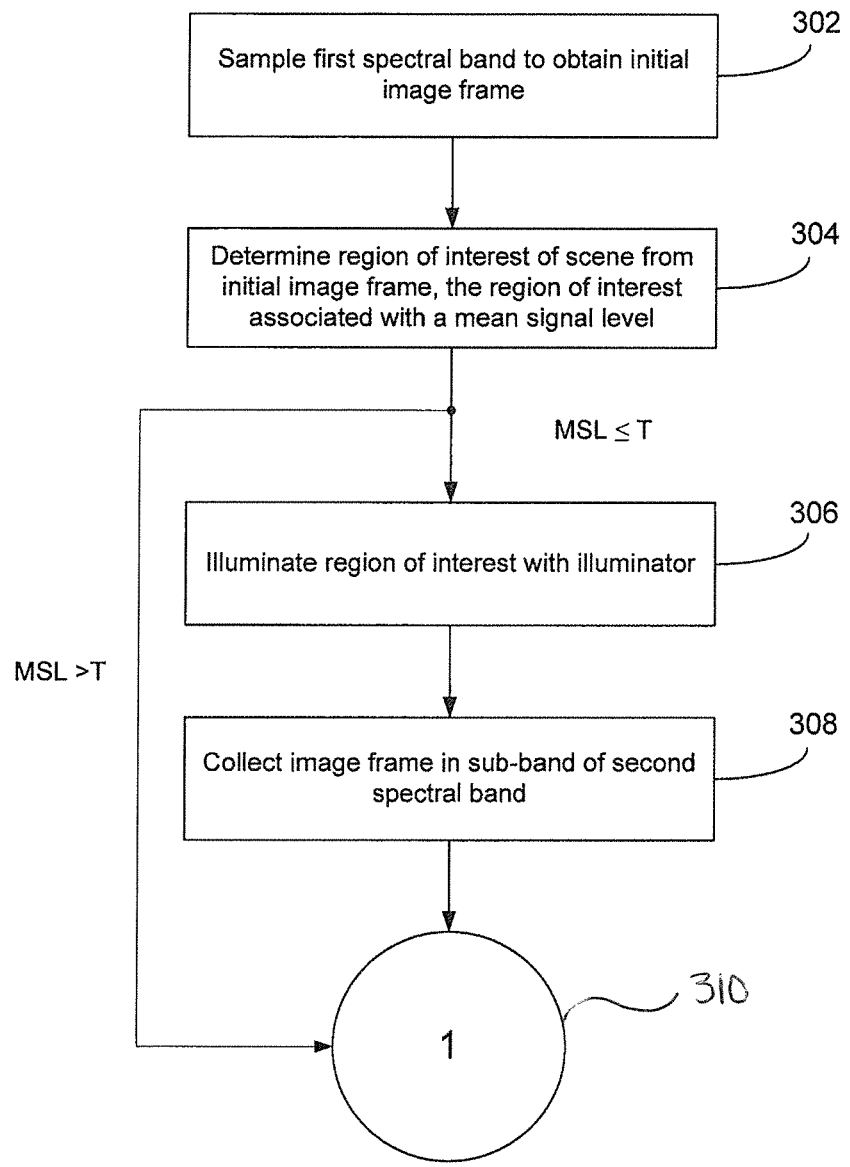
FIG. 3 is a flowchart of a method of providing resolution on demand in an imaging system in accordance with a third embodiment of the present invention.
Figure 4:
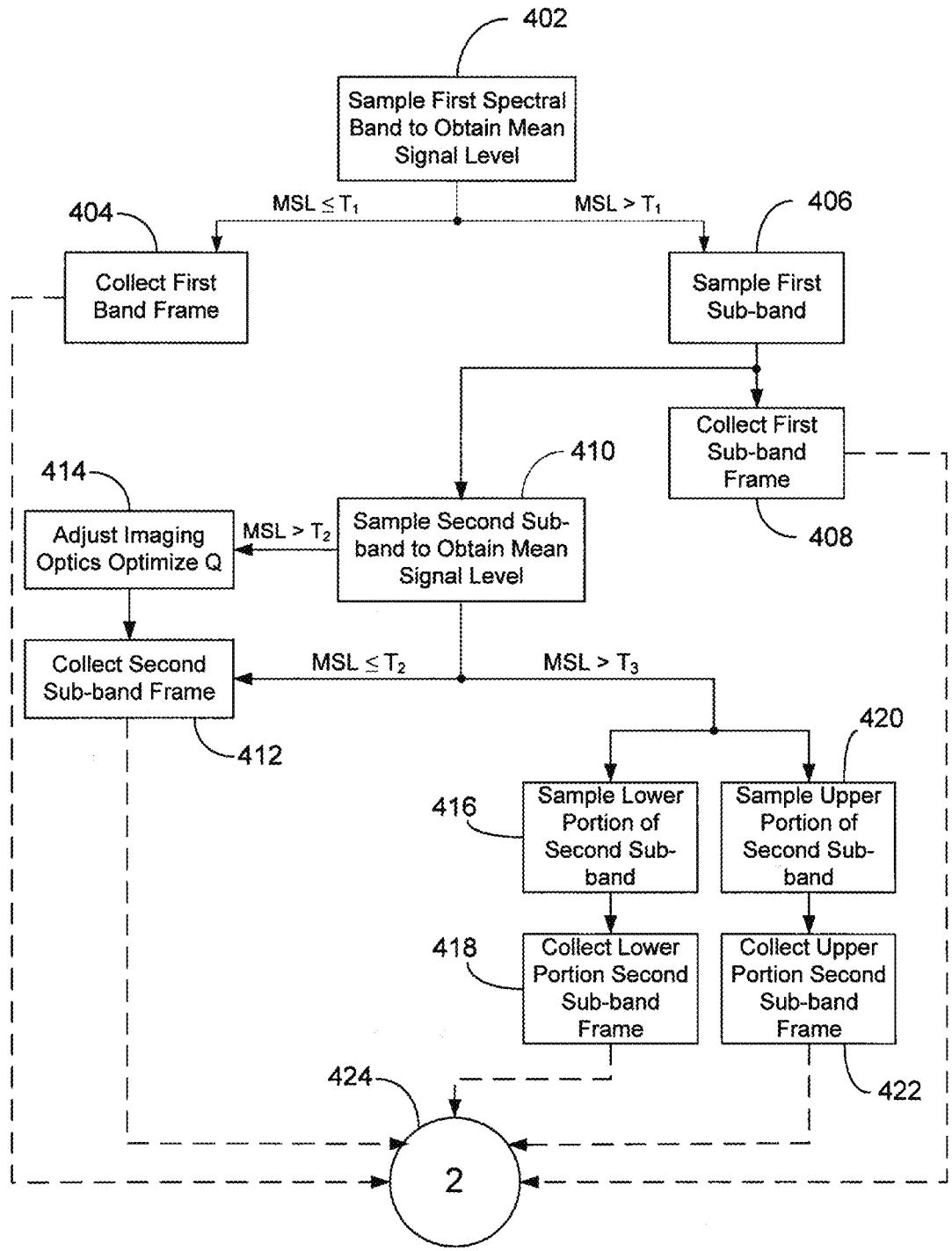
FIG. 4 is a flowchart of a method of providing high-resolution imagery in an imaging system in accordance with a fourth embodiment of the present invention.
Figure 5:
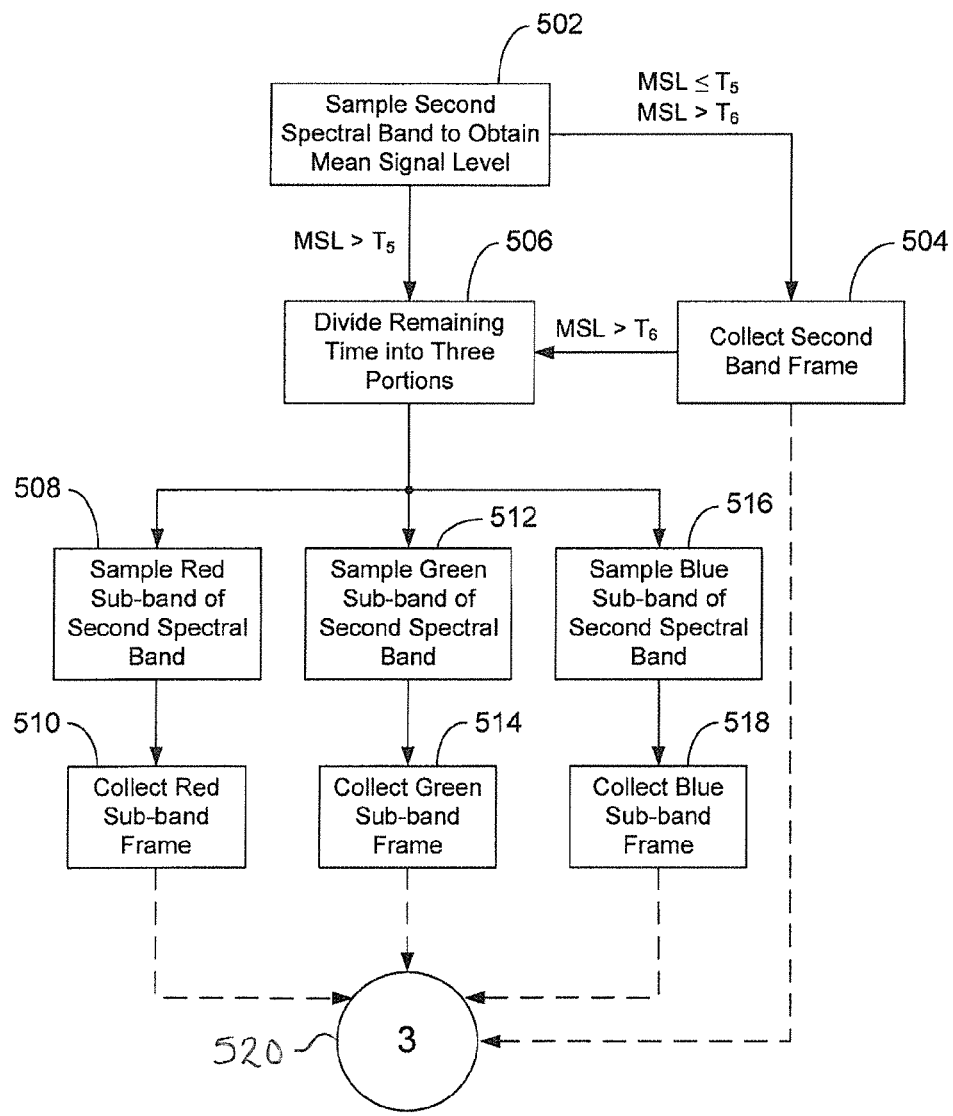
FIG. 5 is a flowchart of a method of providing high-resolution imagery in an imaging system in accordance with a fifth embodiment of the present invention.

Referring still to the cueing controller 110 in FIG. 1, the cueing controller 110, including the other elements of FIG. 1, in addition to any other necessary or desirable components not depicted in FIG. 1, is configured to perform the functionality represented in the embodiments of FIGS. 3-5. The dotted lines depicted in FIG. 1 represent control signals 116 for controlling the various components in the system. In other embodiments, the cueing controller 110 performs only some of the functionality represented in FIGS. 3-5. The cueing controller 110, for example, may include computer readable media embodying program instructions for execution by a data processing apparatus. Such program instructions may adapt the data processing apparatus for monitoring a network. FIGS. 3-5, in part or in whole, identify such program instructions.

The data combiner 112 is coupled to the readout buffer 208 and receives image frames in the form of buffered data therefrom. The data combiner 112, for example, registers the collected image frames, removes airglow path radiance, and provides a sharpened composite image and/or a band ratio image. The sharpened composite image may aid in the visual identification of objects. The band ratio image may highlight distinctive features in the scene. The system is not necessarily limited to sharpened composite images or band ratio images, and may provide any type of image suitable for display.

U.S. Pat. No. 6,011,875 to Laben et al., entitled Process for Enhancing the Spatial Resolution of Multispectral Imagery Using PAN-Sharpening, hereby incorporated by reference in its entirety, identifies some of the various combined images that may be implemented in the data combiner 112. U.S. Pat. No. 6,373,055 to Kerr, entitled Enhanced Vision System Sensitive to Infrared Radiation, hereby incorporated by reference in its entirety, also identifies various combined images that may be implemented in the data combiner 116.

FIG. 2 is a schematic block diagram of an imaging system for providing resolution on demand in accordance with a second embodiment of the present invention.

Referring now to FIG. 2, the imaging system 200 of FIG. 2 differs from the imaging system 100 of FIG. 1 in that the imaging system 200 includes a first focal plane 206 and a second focal plane 208, and a first readout buffer 210 and a second readout buffer 212. Rather than relying solely on the spectral selector 104 to filter and pass through specified wavebands to the focal plane 106, as in FIG. 1, the spectral selector 204 includes a dichroic beam splitter, configured to send all light with wavelengths above a specific threshold to the first focal plane 206 (e.g., above 1.0 μm). For example, wavelengths from 1.0 and up are made to impinge on the first focal plane 206, and wavelengths from about 1.0 and below are made to impinge on the second focal plane 208. The spectral selector 204 may further include a second level spectral selector for the first focal plane 206 including an open position, an MWIR filter, a LWIR filter, a LSWIR filter and a USWIR filter, and a second level spectral selector for the second focal plane 208 including an open position, a UV filter, a PAN filter, and red, blue and green filters. For example, the LSWIR filter is centered near 1.6 μm, the USWIR filter is centered near 2.3 μm, the UV filter is centered near 0.35 μm and the PAN filter covering approximately 0.5 to 0.9 μm. Accordingly, the spectral selector 204 divides the open band upwelling radiation into bands and sub-bands.

The first focal plane 206, for example, comprises an array of mercury cadmium telluride (MCT) detectors arranged as a focal plane array. In other embodiments, the first focal plane 206 comprises an array of indium antimonide (InSb) arranged as a focal plane array or any other array of detectors sensitive to detect imagery in the desired bandwidth of approximately 1.0 µm to 5.0 µm. The MCT detectors typically have about a 10-20 micron metric pitch. The second focal plane 208, for example, comprises an array of charge-coupled device silicon detectors (CCDs) arranged as a focal plane array. The CCD detectors have approximately a 7 micron pitch. In this embodiment, the second focal plane array 208 is sensitive from 0.2 µm to 1.0 µm. In other embodiments, the arrangement of focal planes may be sensitive to wavelengths shorter than 0.2 µm or longer than 2.6 µm.

The first focal plane 206 and the second focal plane 208 provide either a diffraction-limited optical blur or a point-spread function. Each of these focal planes samples its point spread function with a high Q, described by the following equation:

$$Q = \frac{\lambda F/\#}{P_m},$$

where λ is the center wavelength, F/# is the focal ratio of the telescope, and $P_m$ is metric pixel pitch. A high Q, for example, is greater than or equal to 0.5. The optical imaging system 200, for example, has a Q=1 at 1.6 µm, Q≈1.5 at 2.3 µm, Q=1 at 400 nm and Q=2 at 800 nm. Therefore, at a 20 km range from the sensor, the ground sample distance of the optical imaging system 200 is 11 cm for the first focal plane 206 (e.g., the MCT array) and less than 3 cm for the second focal plane 208 (e.g., the CCD array). One of ordinary skill in the art would understand that Q may also be described in terms of pixel pitch in angle θ (PO.

The first readout buffer 210 and the second readout buffer 212 are configured to receive signals representing the scene being imaged from the first focal plane 206 and the second focal plane 208, respectively, and to buffer and transmit this data to the data combiner 216. Those skilled in the art would recognize that focal planes generate analog signals which must be digitized for storage and processing and that calibration coefficients are generally applied to the images to provide correct radiometric units. The digitization and calibration functions are not shown. The first readout buffer 210 and second readout buffer 212 format and store one or more image frames from their respective focal planes. The first readout buffer 210 and the second readout buffer 212 are also coupled to the cueing controller 214 and configured to provide feedback data thereto. The first readout buffer 210 is configured to read out image frames at a rate of thirty frames per second. The second readout buffer 212 is configured to read out frames from the second focal plane 208 in both fast and slow read modes. For frame rates less than 10 frames per second (fps), the slow mode is used and generates about 5 e− read noise per read. For frame rates at or about 60 fps, the fast mode is used and generates about 30 e− read noise per read. The readout for both the first focal plane 206 and the second focal plane array 208 may be non-destructive or may be reset, as is determined by the cueing controller 214.

The cueing controller 214 is coupled to the first focal plane 206, the second focal plane 208, the first readout buffer 210, the second readout buffer 212, and the illuminator 218. The cueing controller 214 senses the ambient signal levels on selected frames in the open filter positions and then sets the frame rate and integration time of the first focal plane 206 and the second focal plane 208 as well as the spectral band of each selector to optimize spatial resolution at a minimum signal to noise ratio. For specific wavebands, however, such as the MWIR band, the cueing controller 214 does not need to sense ambient signal levels before setting the frame rate and integration time of the focal plane 206. The cueing controller 214 may be preset (or alternatively, set by the system user) to optimize spatial resolution, signal to noise ratio, frame rate, and/or other image quality factors. The imaging system 200 may sense the upwelling radiance on a scene or any subset of pixels in a selected spectral band while using a short integration with non-destructive readouts. In other words, if there is sufficient signal to warrant additional collection after sampling the upwelling radiation, then the photons collected during the sampling interval contribute towards the final signal to noise level.

Referring still to the cueing controller 214 in FIG. 2, the cueing controller 214 controls operation of the illuminator 218. For example, the illuminator 218 is a laser or multiple lasers at different wavelengths. In a multiple-laser illuminator 218, the illuminator may illuminate the regions of interest at wavelengths within a second spectral band corresponding to the second focal plane 208, and may also illuminate the regions of interest at one or more wavelengths within a first spectral band corresponding to the first focal plane 206. The illuminator 218 illuminates regions of interest of the scene to provide additional signal level at shorter wavelengths to improve spatial resolution at a minimum signal to noise ratio. In other words, the illuminator 218 illuminates each of the regions of interest that do not have sufficient ambient signal level to generate a useful image frame. For example, the ambient signal level is compared with a respective threshold of a plurality of thresholds (for each of the regions of interest) and the cueing controller 214 commands the illuminator 218 to illuminate the regions of interest that are at or below the corresponding threshold. As is described in greater detail with respect to a third embodiment illustrated in FIG. 3, the cueing controller 214 generates the most efficient schedule for illuminating the regions of interest based on a prioritized scheduling algorithm (not shown in FIG. 3 but described in the section of the detailed description of FIG. 3). In addition, the cueing controller may balance available collection time and illuminator power based on ambient light levels and may direct frame rate and spectral filter selection to collect imagery using the shortest wavelengths given the available signal.

Referring still to the cueing controller 214 in FIG. 2, the cueing controller 110, including the other elements of FIG. 2, in addition to any other necessary or desirable components not depicted in FIG. 2, is configured to perform the functionality represented in the embodiments of FIGS. 3-5. The dotted lines depicted in FIG. 2 represent control signals 220 for controlling the various components in the system. In other embodiments, the cueing controller 214 performs only some of the functionality represented in FIGS. 3-5. The cueing controller 214, for example, may include computer readable media embodying program instructions for execution by a data processing apparatus. Such program instructions may adapt the data processing apparatus for monitoring a network. FIGS. 3-5, in part or in whole, identifies such program instructions.

The data combiner 216 is coupled to the first and second readout buffers 210, 212 and receives image frames in the form of buffered data therefrom. The data combiner 216 registers the collected image frames, removes airglow path radiance, and provides a sharpened composite image and/or a band ratio image. The sharpened composite image aids in the visual identification of objects. The band ratio image highlights distinctive features in the scene. The system is not necessarily limited to sharpened composite images or band ratio images, and may provide any type of image suitable for display.

FIG. 3 is a flowchart of a method of providing resolution on demand in an imaging system in accordance with a third embodiment of the present invention.

Referring now to FIG. 3, at Block 302, a first spectral band is sampled to obtain an initial image frame. The system generally utilizes a short integration interval to obtain the initial image frame to gauge how long the system must integrate the scene to achieve a minimum signal to noise ratio. In an aspect, the first band mean signal level is read but not destroyed so that it contributes to the overall signal level. This may prove to be important because the system may free up additional integration time to integrate over other spectral bands or sub-bands thereof. A nominal sample time is 0.1 seconds, although the sample time may be set to other intervals. One of ordinary skill in the art would understand that the sample time is chosen to find the average signal level (e.g., the first band mean signal level) over the scene with reasonable confidence. In addition to an open band sample, the system may test certain regions of the scene for extremely bright regions that might saturate if the system performs a long integration time.

At Block 304, a region of interest of a scene is determined from the initial image frame. The region of interest is associated with a mean signal level. For example, the mean signal level over the area of the region of interest may be measured from the initial image frame. The region of interest may be determined by shapes of objects, spectral signatures, temperature, motion, changes from previously obtained image frames, other indicators of activity, external cues, or a combination thereof. Each of these triggers may be factored into a prioritized scheduling algorithm such that a threshold temperature, for example, would determine a region of interest if the temperature exceeds the threshold temperature. One of ordinary skill in the art would understand that a difference in at least two frames in the original band collected may determine motion of an object.

At Block 306, the region of interest is illuminated with an illuminator when the mean signal level of the region of interest is at or below a respective threshold (e.g., T in FIG. 3) of a set of thresholds corresponding to multiple regions of interest (e.g., a first plurality of thresholds). The region of interest is illuminated in accordance with a power threshold indicating a minimum illuminator power and agility necessary to illuminate the region of interest. One of ordinary skill in the art would understand that the third embodiment may include illuminating multiple regions of interest and collecting illuminated image frames over the entire scene (including the illuminated regions of interest), or specifically within the area proscribed by each of the regions of interest. For example, the cueing controller may calculate an optimum path to guide the illuminator to point at each region of interest and keep the laser pointed while the illuminator illuminates each of the regions of interest for a specified duration in order to provide sufficient illumination to obtain useful frames. A prioritized scheduling algorithm may be implemented to determine the optimum path. One of ordinary skill in the art would understand that there are many ways to implement a prioritized scheduling algorithm to determine the optimum path of the laser. For example, one criterion of the prioritized scheduling algorithm requires at least a minimum illumination for each of the regions of interest, given a specified diameter ground target to illuminate, and given the available average power of the illuminator. In addition, even though the regions of interest may be determined prior to determining the optimum path for illumination, the prioritized scheduling algorithm may adapt to provide illumination to a subset of the regions of interest should the available average power and agility of the illuminator make it more efficient to do so.

After illuminating the region of interest, at least one sub-region of the at least one region of interest to be illuminated may be determined from the at least one image frame collected in the second spectral band when the at least one image frame collected in the second spectral band has been illuminated using a first illuminator of the at least one illuminator. The at least one sub-region may then be illuminated with at least one illuminator other than the first illuminator, wherein the at least one illuminator other than the first illuminator operates at a wavelength smaller than the first illuminator. At least one image frame may be collected in the at least one sub-region in at least a sub-band of the second spectral band. One of ordinary skill in the art would understand that if the wavelength corresponding to the at least one illuminator falls within the waveband of the first spectral band, the at least one image frame may be collected in the at least one sub-region in at least a sub-band of the first spectral band.

For example, the illuminator includes at least one laser. The at least one laser may include multiple lasers at various wavelengths, and one of ordinary skill in the art would understand that the wavelengths of the lasers is a system design choice and depends on the specific system requirements. For example, a first laser operates at 1.55 µm, and a second laser operates at 0.9 µm. The illuminator power may include the laser power capacity, and the illuminator agility may include the duration necessary to point and operate the laser. For example, a laser operating at 2.3 µm may have a typical spatial extent of 50-m diameter circles as projected on the scene. An illuminator operating with an average power of 150 W may transmit either quasi-CW or pulse (e.g., 10 ms or less) duration to "freeze" moving objects. One of ordinary skill in the art would understand that power levels may be scaled up or down depending on the desired number of regions of interest and their size. The at least one laser may be a coherent laser, and collect synthetic aperture data therefrom.

Referring still to Block 306, laser power and wavelength may be traded to optimize the number of regions of interest imaged and the resolution of the image chips. If the focal plane imaging the regions of interest is designed to have a fixed value of Q for a given illuminator wavelength, then the laser power required to illuminate a region scales as the cube of the wavelength. In addition, the cueing controller may balance available collection time and illuminator power based on ambient light levels and may direct frame rate and spectral filter selection to collect imagery using the shortest wavelengths given the available signal.

At Block 308, at least one illuminated image frame is collected in at least a sub-band of a second spectral band. The at least one illuminated image frame is collected based on available ambient light along with light provided by the illuminator to collect at least one useful frame.

At Block 310, (1) signifies that at least one image to be displayed may be generated from at least the at least one illuminated image frame. In addition, all collected frames may be combined to generate at least one image to be displayed. In another example, the output of (1) from FIG. 3, the output of (2) from FIG. 4 and the output of (3) from FIG. 5 may be combined to generate at least one image to be displayed (e.g., FIG. 6). Alternatively, the collected frames from FIG. 3 may be combined without the collected frames from FIG. 4 or FIG. 5. FIG. 3 depicts varying levels of thresholds such that the higher the average available upwelling radiation from a scene, the greater the number of sub-bands are to be combined to generate the image to be displayed. Various other combinations of bands and/or sub-bands would be understood by one of ordinary skill in the art. For example, the methodology of the fourth embodiment illustrated in FIG. 4 may be overlaid within the existing methodology of the third embodiment illustrated in FIG. 3. In other words, sampling successively narrower sub-bands or selecting and collecting image frames in predetermined sub-bands may be performed in parallel or within the methodology for collecting illuminated image frames according to the third embodiment illustrated in FIG. 3. The imaging system and method herein may be configured to collect three-dimensional data. For example, the illuminated and/or non-illuminated image frames may include three-dimensional image data.

FIG. 4 is a flowchart of a method of providing high-resolution imagery in an imaging system in accordance with a fourth embodiment of the present invention.

Referring now to FIG. 4, the method may include determining a first band mean signal level from the initial image frame (e.g., Block 302 of FIG. 3), and when the first band mean signal level is above a first threshold, sampling successively narrower sub-band in the first spectral band to obtain mean signal levels for each of the successively narrower sub-bands until at least one of the mean signal levels corresponding to one of the successively narrower sub-bands is at or below a respective threshold of a plurality of thresholds, and collecting at least one image frame in each of the sampled sub-bands for which the corresponding mean signal level is above the respective threshold of the plurality of thresholds.

In greater detail, at Block 402, a first spectral band is sampled to obtain a mean signal level (e.g., the sampled radiation collected in an open band of the first focal plane). The first spectral band includes a first plurality of sub-bands. The system generally utilizes a short integration interval to obtain the first band mean signal to gauge how long the system must integrate the scene to achieve a minimum signal to noise ratio. In an aspect, the first band mean signal level is read but not destroyed so that it contributes to the overall signal level. This may prove to be important because the system may free up additional integration time to integrate over other spectral bands or sub-bands thereof. A nominal sample time is 0.33 seconds, although the sample time may be set to other intervals. Data collected in many pixels may be combined to assess the level of upwelling radiation. One of ordinary skill in the art would understand that the sample time is chosen to find the average signal level (e.g., the first band mean signal level) over the scene with reasonable confidence. In addition to an open band sample, the system may test certain regions of the scene for extremely bright regions that might saturate if the system performs a long integration time.

At Block 404, a first band image frame is collected when the first band mean signal level is at or below a threshold (e.g., a first threshold $T_1$ in FIG. 4). The first threshold, for example, is a predetermined threshold that is set by a system user. The first threshold may also be adjustable depending on the system requirements and overall desired image quality. The first band image frame is collected by integrating over the first spectral band for a time period determined by the first band mean signal level. In other words, the system must integrate over the first spectral band for a time period sufficient to obtain a useable frame. The significance of the first band mean signal level being at or below the first threshold is that there is insufficient signal level in the first spectral band to obtain useable frames in a sub-band of the first plurality of sub-bands. Accordingly, integrating over the entire bandwidth of the first spectral band generates the best useable frame given the available radiation from the scene, since the average available radiation from the scene does not exceed the first threshold.

At Block 406, a first sub-band of the first plurality of sub-bands is sampled to obtain a first sub-band mean signal level when the first band mean signal level is above the first threshold. The first sub-band mean signal level indicates the average signal level over the first sub-band of the first plurality of sub-bands. In an aspect, the first sub-band mean signal level is read but not destroyed so that it contributes to the overall signal level. This may prove to be important because the system may free up additional integration time to integrate over other spectral bands or sub-bands thereof. A nominal sample time is 0.33 seconds, although the sample time may be set to other intervals. As stated with respect to the first spectral band, data collected in many pixels may be combined to assess the level of upwelling radiation. One of ordinary skill in the art would understand that the sample time is chosen to find the average signal level (e.g., the first sub-band mean signal level) over the scene with reasonable confidence. In addition to the first sub-band sample, the system may test certain regions of the scene for extremely bright regions that might saturate if the system performs a long integration time. The first sub-band of the first plurality of sub-bands, for example, is an upper short-wave infrared sub-band or a portion thereof. The upper short-wave infrared sub-band generally corresponds to 2.0 µm to 2.6 µm. Although the first sub-band of the first plurality of sub-bands is identified as the upper short wave infrared sub-band in FIG. 3, in other embodiments, the first sub-band may include all or part of other bands or sub-bands in any part of the spectrum where there exists available radiation to generate a useful image frame.

At Block 408, a first sub-band image frame (e.g., a first frame) is collected in the first sub-band of the first plurality of sub-bands. As seen in FIG. 4, the first sub-band image frame is collected only when the first band mean signal level is above the first threshold. The significance of the first band mean signal level being greater than the first threshold is that there is sufficient signal level to obtain a useable frame (e.g., the first sub-band image frame). Accordingly, one of ordinary skill in the art would recognize that the first threshold is chosen to ensure that a useable frame is collected.

At Block 410, a second sub-band of the first plurality of sub-bands is sampled to obtain a second sub-band mean signal level. The second sub-band mean signal level indicates the average radiation available within the second sub-band. In an aspect, the second sub-band mean signal level is read but not destroyed so that it contributes to the overall signal level. This may prove to be important because the system may free up additional integration time to integrate over other spectral bands or sub-bands thereof. A nominal sample time is 0.33 seconds, although the sample time may be set to other intervals. As stated with respect to the first spectral band, data collected in many pixels may be combined to assess the level of upwelling radiation. One of ordinary skill in the art would understand that the sample time is chosen to find the average signal level (e.g., the second sub-band mean signal level) over the scene with reasonable confidence. In addition to the second sub-band sample, the system may test certain regions of the scene for extremely bright regions that might saturate if the system performs a long integration time. The second sub-band of the first plurality of sub-bands, for example, is a lower short-wave infrared sub-band or a portion thereof. The lower short-wave infrared sub-band generally corresponds to 1.0 µm to 2.0 µm. Although the second sub-band of the first plurality of sub-bands is identified as the lower short wave infrared sub-band in FIG. 3, in other embodiments, the second sub-band may include all or part of other bands or sub-bands in any part of the spectrum where there exists available radiation to generate a useful image frame.

At Block 412, a second sub-band image frame (e.g., a second frame) is collected in the second sub-band of the first plurality of sub-bands when the second sub-band mean signal level is at or below a second threshold. The second threshold, for example, is a predetermined threshold that is set by a system user. The second threshold may also be adjustable depending on the system requirements and overall desired image quality. The second sub-band image frame is collected by integrating over the second sub-band for a time period determined by the second sub-band mean signal level. In other words, the system must integrate over the second sub-band for a time period sufficient to obtain a useable frame. The significance of the second sub-band mean signal level being at or below the second threshold is that there is insufficient signal level in the second sub-band to obtain useable frames in the second sub-band. Accordingly, integrating over the entire second sub-band generates a useable frame given the available radiation from the scene, since the average available radiation from the scene does not exceed the second threshold.

At Block 414, the imaging optics is adjusted to balance image edge contrast with amount of collected signal. The result of this balance is to optimize Q in each sub-band, described by the following equation:

$$Q = \frac{\lambda F/\#}{P_m},$$

where λ is the center wavelength, F/# is the focal ratio of the telescope, and $P_m$ is metric pixel pitch. A high Q, for example, is greater than or equal to 0.5. The optical imaging system 100, for example, has a Q=1 at 1.6 um, Q≈1.5 at 2.3 um, Q=1 at 400 nm and Q=2 at 800 nm. Therefore, at a 20 km range from the sensor, the ground sample distance of the optical imaging system 100 is 11 cm for the first focal plane (e.g., the MCT array) and less than 3 cm for the second focal plane 108 (e.g., the CCD array). One of ordinary skill in the art would understand that Q may also be described in terms of pixel pitch in angle θ ($P_θ$).

For example, the imaging optics may be adjusted to obtain a maximum amount of signal level or to obtain a highest image edge contrast. In another aspect, the imaging optics may be adjusted such that a threshold image edge contrast is reached while a threshold signal level is reached. Once the imaging optics is adjusted, the second image frame is collected in the second sub-band of the first plurality of sub-bands, as in Block 412. The imaging optics may be adjusted by increasing or decreasing focal length of the imaging optics or by introducing staring dither by slightly moving the imaging optics between exposures (e.g., image frames). When Q is greater than 2, the data combiner 112, 216 may correct geometric aberrations caused by telescope errors or pointing motion.

The second image frame is collected by integrating over the second sub-band for a time period determined by the second sub-band mean signal level. In other words, the system must integrate over the second sub-band for a time period sufficient to obtain a useable frame. Here, the significance of the second sub-band mean signal level being above the third threshold is that there is sufficient signal level in the second sub-band to obtain useable frames in the second sub-band after adjusting the focal length to optimize Q in each sub-band. Accordingly, integrating over the second sub-band generates a useable frame given the available radiation from the scene, since the average available radiation from the scene exceeds the third threshold.

At Block 416, a lower half of the second sub-band is sampled to obtain a mean signal level in the lower half of the second sub-band when the second sub-band mean signal level is above a fourth threshold. The mean signal level of the lower half of the second sub-band indicates the average radiation available within the lower half of the second sub-band. In an aspect, the mean signal level in the lower half of the second sub-band is read but not destroyed so that it contributes to the overall signal level. This may prove to be important because the system may free up additional integration time to integrate over other spectral bands or sub-bands thereof. A nominal sample time is 0.33 seconds, although the sample time may be set to other intervals. Data collected in many pixels may be combined to assess the level of upwelling radiation. One of ordinary skill in the art would understand that the sample time is chosen to find the average signal level (e.g., the mean signal level in the lower half of the second sub-band mean signal level) over the scene with reasonable confidence. In addition to the sample of the lower half of the second sub-band, the system may test certain regions of the scene for extremely bright regions that might saturate if the system performs a long integration time. The fourth threshold, for example, is a predetermined threshold that is set by a system user. The fourth threshold may also be adjustable depending on the system requirements and overall desired image quality.

At Block 418, a lower portion second sub-band image frame is collected in the lower half of the second sub-band. The lower portion second sub-band image frame is collected by integrating over the lower half of the second sub-band for a time period determined by the mean signal level of the lower half of the second sub-band. In other words, the system must integrate over the lower half of the second sub-band for a time period sufficient to obtain a useable frame. The significance of the second sub-band mean signal level being above the fourth threshold is that there is sufficient signal level in the lower half of the second sub-band to obtain useable frames in the lower half of the second sub-band. Accordingly, integrating over the lower half of the second sub-band generates a useable frame given the available radiation from the scene, since the average available radiation from the scene exceeds the fourth threshold.

At Block 420, an upper half of the second sub-band is sampled to obtain a mean signal level in the upper half of the second sub-band when the second sub-band mean signal level is above the fourth threshold. The mean signal level of the upper half of the second sub-band indicates the average radiation available within the upper half of the second sub-band. In an aspect, the mean signal level in the upper half of the second sub-band is read but not destroyed so that it contributes to the overall signal level. This may prove to be important because the system may free up additional integration time to integrate over other spectral bands or sub-bands thereof. A nominal sample time is 0.33 seconds, although the sample time may be set to other intervals. Data collected in many pixels may be combined to assess the level of upwelling radiation. One of ordinary skill in the art would understand that the sample time is chosen to find the average signal level (e.g., the mean signal level in the upper half of the second sub-band mean signal level) over the scene with reasonable confidence. In addition to the sample of the upper half of the second sub-band, the system may test certain regions of the scene for extremely bright regions that might saturate if the system performs a long integration time.

At Block 422, an upper portion second sub-band image frame is collected in the upper half of the second sub-band. The upper portion second sub-band image frame is collected by integrating over the upper half of the second sub-band for a time period determined by the mean signal level of the upper half of the second sub-band. In other words, the system must integrate over the upper half of the second sub-band for a time period sufficient to obtain a useable frame. As with the lower half of the second sub-band, the significance of the second sub-band mean signal level being above the fourth threshold is that there is sufficient signal level in the upper half of the second sub-band to obtain useable frames in the upper half of the second sub-band. Accordingly, integrating over the upper half of the second sub-band generates a useable frame given the available radiation from the scene, since the average available radiation from the scene exceeds the fourth threshold.

At Block 424, (2) signifies that all collected frames may be combined to generate at least one image to be displayed. For example, the output of (1) from FIG. 3, the output of (2) from FIG. 4, and the output of (3) from FIG. 5 may be combined to generate at least one image to be displayed (e.g., FIG. 6). Alternatively, the collected frames from FIG. 3 may be combined without the collected frames from FIG. 4 or FIG. 5. FIG. 3 depicts varying levels of thresholds such that the higher the average available radiation from a scene, the greater the number of sub-bands are to be combined to generate the image to be displayed. Various other combinations of bands and/or sub-bands would be understood by one of ordinary skill in the art. For example, the methodology of the fourth embodiment illustrated in FIG. 4 may be overlaid within the existing methodology of the third embodiment illustrated in FIG. 3. In other words, sampling successively narrower sub-bands or selecting and collecting image frames in predetermined sub-bands may be performed in parallel or within the methodology for collecting illuminated image frames according to the third embodiment illustrated in FIG. 3.

FIG. 5 is a flowchart of a method of providing high-resolution imagery in an imaging system in accordance with a fifth embodiment of the present invention.

Referring now to FIG. 5, the method may include determining a first band mean signal level from the initial image frame (e.g., Block 302 of FIG. 3), and when the first band mean signal level is above a threshold (e.g., a first threshold), sampling sub-bands in the first spectral band to obtain mean signal levels for each of the sub-bands, and collecting at least one image frame in each of the sampled sub-bands for which the corresponding mean signal level is above another threshold (e.g., a second threshold). In addition, the embodiment of FIG. 4 may be combined with the present embodiment to collect a variety of image frames in various sub-bands according to the first and second thresholds. For example, it may be advantageous to sample and collect image frames in successively narrower sub-bands of the first spectral band for a particular portion of the first spectral band, and it may be advantageous to select specific sub-bands to sample and collect image frames in a remaining portion of the first spectral band without attempting to sample and collect successively narrower sub-bands of the first spectral band.

In greater detail, at Block 502, the second spectral band is sampled to obtain a second band mean signal level (e.g., the sampled radiation collected in an open band of the second focal plane 208 of FIG. 2). The system generally utilizes a short integration interval to obtain the second band mean signal to gauge how long the system must integrate the scene to achieve a minimum signal to noise ratio. In an aspect, the second band mean signal level is read but not destroyed so that it contributes to the overall signal level. This may prove to be important because the system may free up additional integration time to integrate over other spectral bands or sub-bands thereof. A nominal sample time is 0.1 seconds, although the sample time may be set to other intervals. One of ordinary skill in the art would understand that the sample time is chosen to find the average signal level (e.g., the second band mean signal level) over the scene with reasonable confidence. In addition to an open band sample, the system may test certain regions of the scene for extremely bright regions that may saturate if the system performs a long integration time.

At Block 504, a second band image frame is collected when the second band mean signal level is at or below a fifth threshold or above a sixth threshold. The second band image frame is collected by integrating over the entire second spectral band for a time period determined by the second band mean signal level. In other words, the system must integrate over the second spectral band for a time period sufficient to obtain a useable frame. The significance of the second band mean signal level being at or below the fourth threshold is that there is sufficient signal level in the second spectral band to obtain useable frames in the second spectral band, but not sufficient signal level in the second spectral band to obtain useful frames in sub-bands of the second plurality of sub-bands. The significance of the second band mean signal level being above the fifth threshold is that there is sufficient signal level in the second spectral band to obtain useful frames in the second spectral band and sufficient signal level in sub-bands of the second plurality of sub-bands to obtain useful frames in the second plurality of sub-bands. Accordingly, integrating over the second spectral band generates a useable frame given the available radiation from the scene, since the average available radiation from the scene is at least enough to collect a frame in the second spectral band.

At Block 506, a remaining time of a maximum integration time is divided into a first time portion, a second time portion and a third time portion when the second band mean signal level is above the fourth threshold. The maximum integration time is a system parameter that depends on the specific application and desired results. For example, the maximum integration time is set to avoid smear or other undesirable characteristics resulting from too long of time spent integrating. The remaining time is the difference between the maximum integration time and the time spent integrating during preceding sampling and/or frame collecting. In other embodiments, the remaining time is divided into two portions or four or more portions, depending on the sub-bands remaining to be sampled and collected. The significance of the second band mean signal level being above the fourth threshold is that there is sufficient signal level in sub-bands of the second spectral band to obtain useful frames in the second plurality of sub-bands, but not sufficient signal level in the second spectral band to obtain useful frames in the entire second spectral band and sub-bands of the second spectral band.

As was described in reference to Block 504, when the second band mean signal level is above the fifth threshold, the second band image frame is collected. In addition, when the second band mean signal level is above the fifth threshold, at Block 408, the remaining time of the maximum integration time is divided into the first time portion, the second time portion and the third time portion. The significance of the second band mean signal level being above the fifth threshold is that there is sufficient signal level in the second spectral band as well as sub-bands of the second spectral band to obtain useful frames in the entire second spectral band and sub-bands of the second spectral band.

At Block 508, a red sub-band of the second plurality of sub-bands is sampled to obtain a red sub-band mean signal level when the second band mean signal level is at least above the fourth threshold. The second band mean signal level indicates the average radiation available within the second spectral band. In an aspect, the red sub-band band mean signal level is read but not destroyed so that it contributes to the overall signal level. This may prove to be important because the system may free up additional integration time to integrate over other spectral bands or sub-bands thereof. A nominal sample time is 0.33 seconds, although the sample time may be set to other intervals. Data collected in many pixels may be combined to assess the level of upwelling radiation. One of ordinary skill in the art would understand that the sample time is chosen to find the average signal level (e.g., the red sub-band mean signal level) over the scene with reasonable confidence. In addition to the red sub-band sample, the system may test certain regions of the scene for extremely bright regions that may saturate if the system performs a long integration time. The red sub-band, for example, corresponds to 0.6 µm to 0.7 µm.

At Block 510, a red sub-band image frame is collected in the red sub-band of the second plurality of sub-bands when the second band mean signal level is above the fifth threshold. The red sub-band image frame is collected by integrating over the red sub-band for at least a time period determined by the red sub-band mean signal level. In other words, the system must integrate over the red sub-band for a time period sufficient to obtain a useable frame. The significance of the red sub-band mean signal level being above the fifth threshold is that there is sufficient signal level in the red sub-band to obtain useable frames in the red sub-band. Accordingly, integrating over the red sub-band generates a useable frame given the available radiation from the scene, since the average available radiation from the scene exceeds the fifth threshold.

At Block 512, a green sub-band of the second plurality of sub-bands is sampled to obtain a green sub-band mean signal level when the second band mean signal level is above the fifth threshold (logically, if the second band mean signal level is above the fifth threshold, the second band mean signal level is also above the sixth threshold). The second band mean signal level indicates the average radiation available within the second spectral band. In an aspect, the green sub-band band mean signal level is read but not destroyed so that it contributes to the overall signal level. This may prove to be important because the system may free up additional integration time to integrate over other spectral bands or sub-bands thereof. A nominal sample time is 0.1 seconds, although the sample time may be set to other intervals. One of ordinary skill in the art would understand that the sample time is chosen to find the average signal level (e.g., the green sub-band mean signal level) over the scene with reasonable confidence. In addition to an green sub-band sample, the system may test certain regions of the scene for extremely bright regions that may saturate if the system performs a long integration time. The green sub-band, for example, corresponds to 0.5 µm to 0.6 µm.

At Block 514, a green sub-band image frame is collected in the green sub-band of the second plurality of sub-bands when the second band mean signal level is above the fifth threshold. The green sub-band image frame is collected by integrating over the green sub-band for at least a time period determined by the green sub-band mean signal level. In other words, the system must integrate over the green sub-band for a time period sufficient to obtain a useable frame. The significance of the green sub-band mean signal level being above the sixth threshold is that there is sufficient signal level in the green sub-band to obtain useable frames in the green sub-band. Accordingly, integrating over the green sub-band generates a useable frame given the available radiation from the scene, since the average available radiation from the scene exceeds the fifth threshold.

At Block 516, a blue sub-band of the second plurality of sub-bands is sampled to obtain a blue sub-band mean signal level when the second band mean signal level is above the fifth threshold (logically, if the second band mean signal level is above the fifth threshold, the second band mean signal level is also above the sixth threshold). The second band mean signal level indicates the average radiation available within the second spectral band. In an aspect, the blue sub-band band mean signal level is read but not destroyed so that it contributes to the overall signal level. This may prove to be important because the system may free up additional integration time to integrate over other spectral bands or sub-bands thereof. A nominal sample time is 0.1 seconds, although the sample time may be set to other intervals. One of ordinary skill in the art would understand that the sample time is chosen to find the average signal level (e.g., the blue sub-band mean signal level) over the scene with reasonable confidence. In addition to the blue sub-band sample, the system may test certain regions of the scene for extremely bright regions that may saturate if the system performs a long integration time. The blue sub-band, for example, corresponds to 0.4 µm to 0.5 µm.

At Block 518, a blue sub-band image frame is collected in the blue sub-band of the second plurality of sub-bands when the second band mean signal level is above the fifth threshold. The blue sub-band image frame is collected by integrating over the blue sub-band for at least a time period determined by the blue sub-band mean signal level. In other words, the system must integrate over the blue sub-band for a time period sufficient to obtain a useable frame. The significance of the blue sub-band mean signal level being above the fifth threshold is that there is sufficient signal level in the blue sub-band to obtain useable frames in the blue sub-band. Accordingly, integrating over the blue sub-band generates a useable frame given the available radiation from the scene, since the average available radiation from the scene exceeds the fifth threshold.

Referring now to Blocks 508-518, if the red sub-band image frame, the green sub-band image frame and the blue sub-band image frame are the final frames to be collected, the red sub-band image frame is collected for the first time period, the green sub-band image frame is collected for the second time period, and the blue sub-band image frame is collected for the third time period. This ensures that the final frames to be collected efficiently utilize the remaining time of the maximum integration time. In this embodiment, it may be unnecessary to sample the red sub-band, the green sub-band and the blue sub-band before collecting the red sub-band image frame, the green sub-band image frame and the blue sub-band image frame. This is because the amount of signal measured in the open band may be used by the adaptive controller to set a sequence of image collections in red, green, and blue without sampling each one individually.

However, in other embodiments, the red sub-band image frame, the green sub-band image frame and the blue sub-band image frame may not be the final frames to be collected. In those embodiments, the system and method thereof are designed to determine how many common frames exist and to divide the remaining time accordingly. If there are no common frames (e.g., the red sub-band image frame, the green sub-band image frame and the blue sub-band image frame, or the upper half and the lower half of the second sub-band of the first plurality of sub-bands), the final frame will be integrated for the remaining time.

Referring still to Blocks 508-518, the bands have been characterized as corresponding to the red band (0.6 μm to 0.7 μm), the green band (0.5 μm to 0.6 μm) and the blue band (0.4 μm to 0.5 μm). However, in other embodiments, it may be advantageous to furcate a band or final band (e.g., to use up the remaining time in the maximum integration time) into three or more sub-bands before collecting frames in each of the sub-bands. One of ordinary skill in the art would recognize that various physical or system properties may dictate which band or bands to furcate.

At Block 520, (3) signifies that all collected frames may be combined to generate at least one image to be displayed. For example, the output of (1) from FIG. 3, the output of (2) from FIG. 4, and the output of (3) from FIG. 5 may be combined to generate at least one image to be displayed (e.g., FIG. 6). Alternatively, the collected frames from FIG. 3 may be combined without the collected frames from FIG. 4 or FIG. 5. FIG. 3 depicts varying levels of thresholds such that the higher the average available radiation from a scene, the greater the number of sub-bands are to be combined to generate the image to be displayed. Various other combinations of bands and/or sub-bands would be understood by one of ordinary skill in the art. For example, the methodology of the fourth embodiment illustrated in FIG. 4 may be overlaid within the existing methodology of the third embodiment illustrated in FIG. 3. In other words, sampling successively narrower sub-bands or selecting and collecting image frames in predetermined sub-bands may be performed in parallel or within the methodology for collecting illuminated image frames according to the third embodiment illustrated in FIG. 3.

Figure 6:
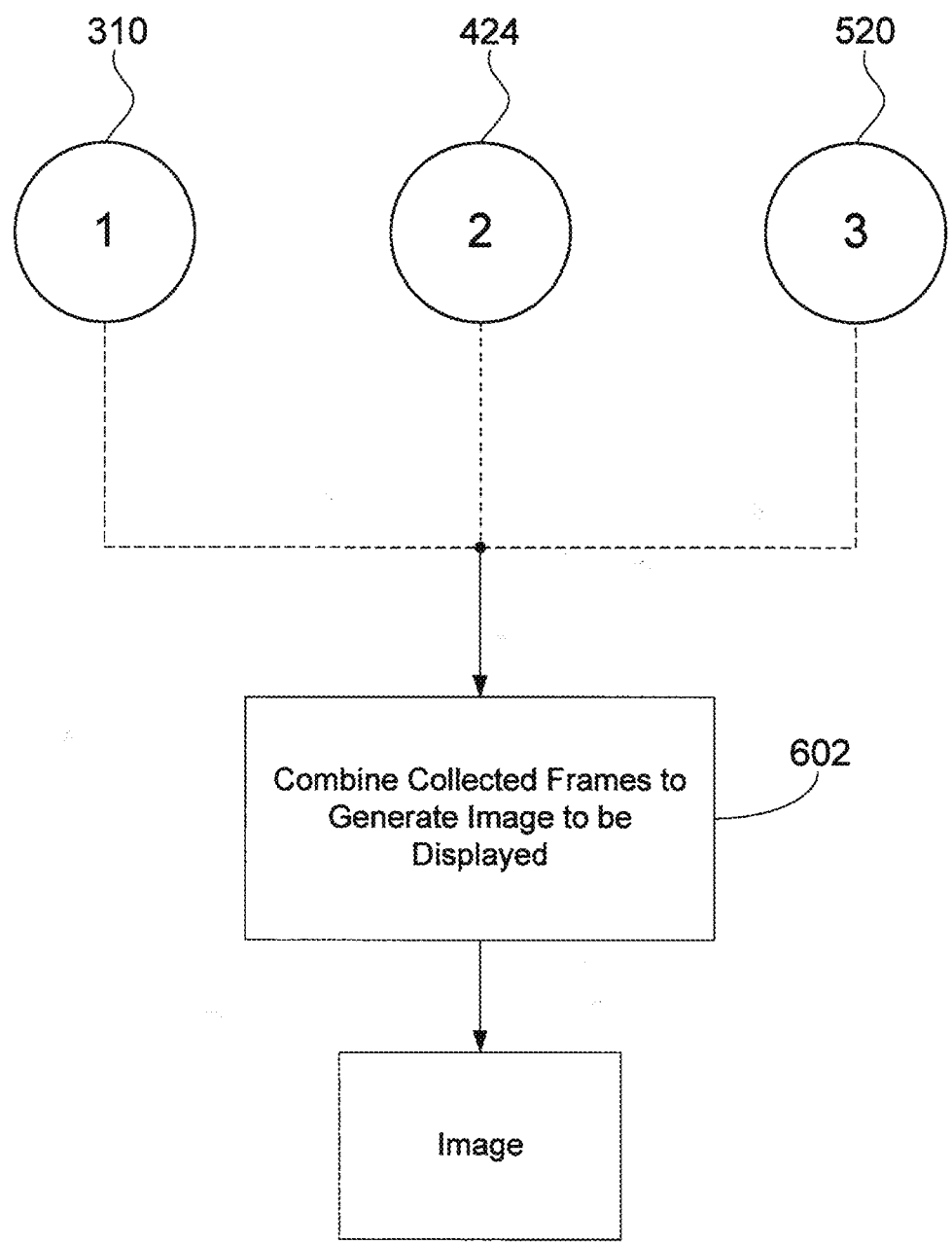
FIG. 6 is a flowchart of a method of providing resolution on demand in an imaging system in accordance with a sixth embodiment of the present invention.

FIG. 6 is a flowchart of a method of providing resolution on demand in an imaging system in accordance with a sixth embodiment of the present invention.

Referring now to FIG. 6, as has been described, the output of (1) from FIG. 3 (e.g., Block 310), the output of (2) from FIG. 4 (e.g., Block 424), and the output of (3) from FIG. 5 (e.g., Block 520) may be combined to generate at least one image frame to be displayed. For example, (1), (2), and/or (3) may output illuminated and/or non-illuminated image frames. Block 602 signifies that any combination of collected frames may be combined to generate an image to be displayed. One of ordinary skill in the art would understand that a series of images may be generated to be displayed during corresponding frame times in accordance with a frame rate. Typical frame rates have been described with respect to the first and second focal planes 206, 208 of FIG. 2.

Figure 7:
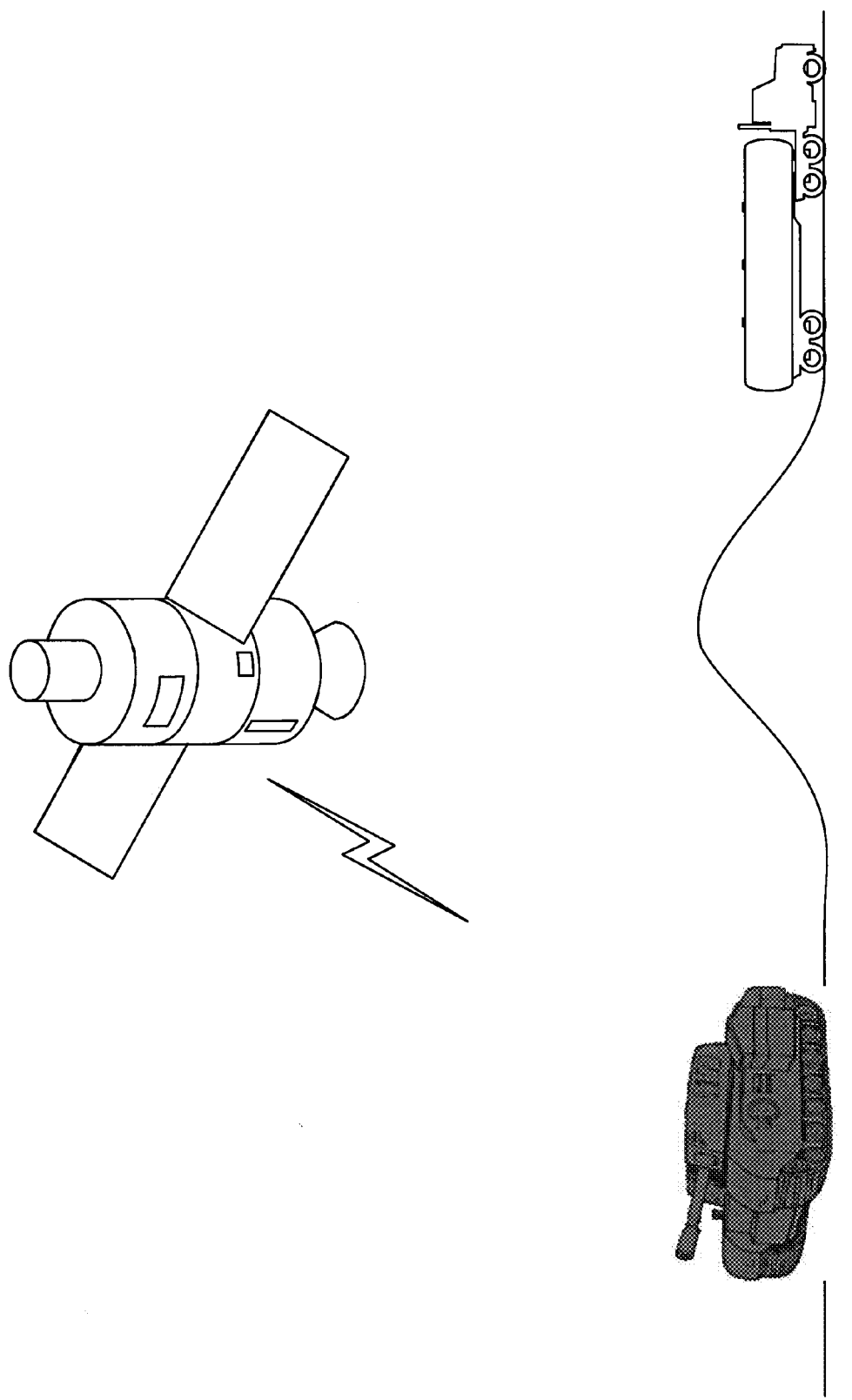
FIG. 7 is a diagram of an imaging system for providing resolution on demand in accordance with a seventh embodiment of the present invention.

FIG. 7 is a diagram of an imaging system for providing resolution on demand in accordance with a seventh embodiment of the present invention.

Referring now to FIG. 7, the imaging system and method for providing resolution on demand may be implemented using a Medium Earth Orbit (MEO) satellite system (e.g., MEO Persistent Surveillance). For example, the MEO system may include nighttime capabilities. Based on the observation that laser power (e.g., illuminator power) is range independent for a given area, an illuminator may be implemented in the MEO system according to the seventh embodiment of the present invention. One of ordinary skill in the art would recognize that the availability of portions of the spectrum is dependent upon various conditions, including atmospheric conditions. For example, a waveband from about 0.2 to 0.3 would appear opaque when attempting to collect images through the upper atmosphere of the Earth, namely, the solar blind UV portion of the spectrum.

Figure 8:
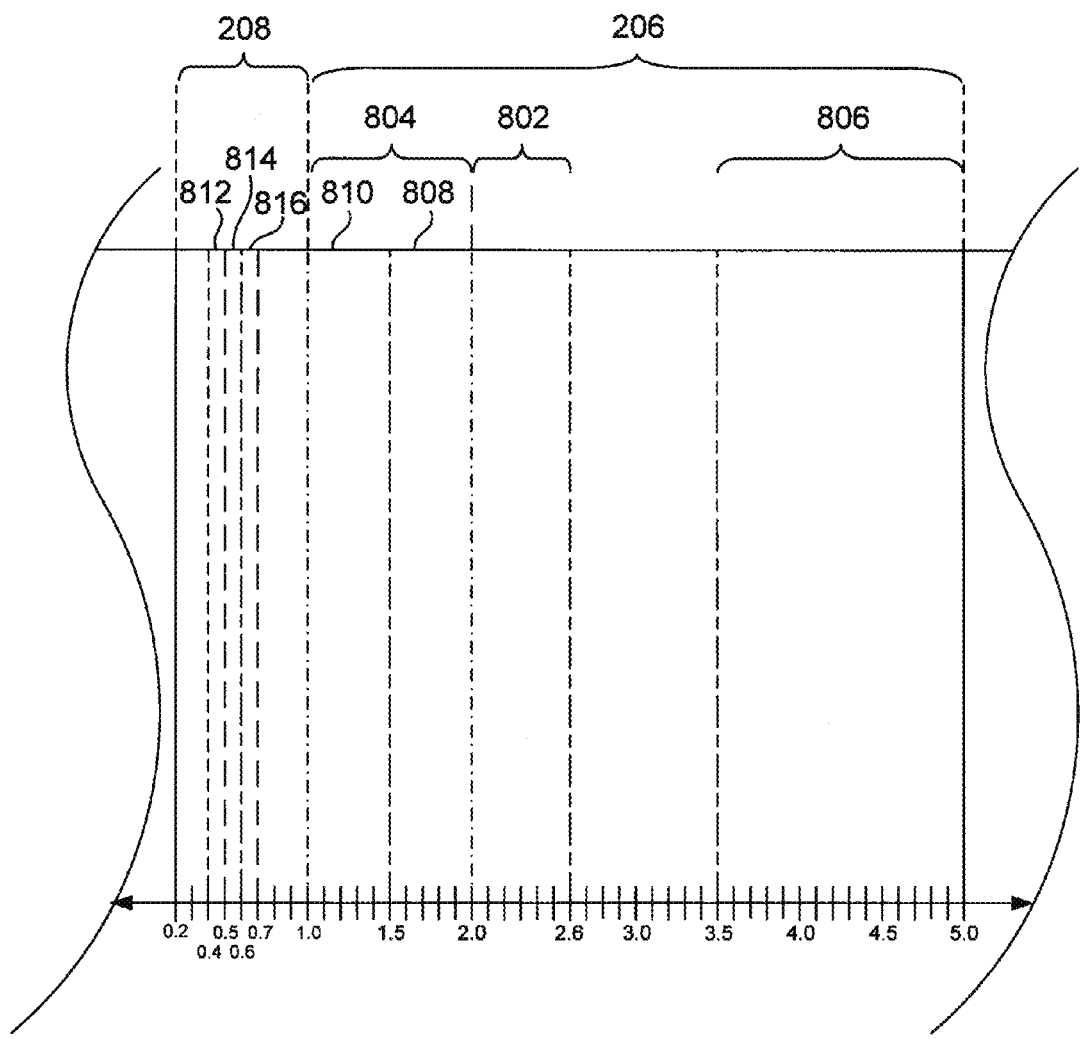
FIG. 8 is a graph illustrating exemplary wavebands that are used to collect imagery with the imaging system and method for providing resolution on demand according to the embodiments of the present invention in FIGS. 2-7.

FIG. 8 is a graph illustrating exemplary wavebands that are used to collect imagery with the imaging system and method for providing resolution on demand according to the embodiments of the present invention in FIGS. 2-7. FIG. 8 identifies the first focal plane 206 covering a waveband of 1.0 μm to 5.0 μm and the second focal plane 208 covering a waveband of 0.2 μm to 1.0 μm. Within the waveband covered by the first focal plane array, an upper short-wave infrared waveband 802 (e.g., the first sub-band of the first plurality of sub-bands), a lower short-wave infrared waveband 804 (e.g., the second sub-band of the first plurality of sub-bands) is depicted, and an MWIR band 806 is depicted. Within the lower short-wave infrared waveband 804, an upper half of the lower short-wave infrared waveband 808 (e.g., the upper half of the second sub-band of the first plurality of sub-bands) and a lower half of the lower short-wave infrared waveband 810 (e.g., the lower half of the second sub-band of the first plurality of sub-bands) is depicted. Within the waveband covered by the second focal plane array, a blue waveband 812 (e.g., the blue sub-band of the second plurality of sub-bands), a green waveband 814 (e.g., the green sub-band of the second plurality of sub-bands) and a red waveband 816 (e.g., the red sub-band of the second plurality of sub-bands) is depicted. The spectral selector 204 of FIG. 2 filters the upwelling radiation received by the opto-mechanical imaging system 202 to pass wavebands corresponding to the sub-bands in FIGS. 3-6 to the data combiner 216 to be combined into a composite image.

However, one of ordinary skill in the art would recognize that the system and method thereof presented herein is not limited to the specified bands and sub-bands described in reference to FIGS. 3-6, but may include additional bands or sub-bands or portions thereof not specifically mentioned. For example, the bands or sub-bands may include wavelengths less than 0.2 μm or greater than 5.0 μm, or may include part or all of each waveband depicted in FIG. 8.

Accordingly, referring to FIGS. 2-7, one of ordinary skill in the art would recognize that the method and system herein may be modified to include sampling and/or collecting bands and/or sub-bands thereof in wavebands not covered in FIGS. 2-7. For example, the first focal plane 206 may be sensitive to bands that cover 0.2 μm to 2.6 μm. The second focal plane 208 may be sensitive to bands that cover 2.6 μm to 5.0 μm (e.g., bands above the upper short wave infrared band, including the MWIR band (3.5 μm to 5.0 μm). Although not explicitly depicted in FIGS. 3-6, any of the methods depicted in FIGS. 3-6 may be modified to collect frames in the MWIR band. Generally speaking, collecting frames in the MWIR band would not require sampling the MWIR band to obtain a minimum integration time since in most, if not all situations, there is sufficient radiation present from a scene to collect useful frames in the MWIR band. In addition, it may be advantageous for some system designs to collect frames in the PAN band (e.g., 0.5 to 0.9 μm). Depending on atmospheric conditions, the type of scene or target, or the time of day or night, it may be advantageous to collect frame(s) in the MWIR band while collecting frame(s) in the VIS, NIR, LSWIR and USWIR. For example, with moving targets, collecting MWIR frames may result in blurrier imagery but with higher signal to noise ratio (e.g., higher signal, less noise). With static targets, collecting USWIR and/or LSWIR frames may result in crisper imagery but with lower signal to noise ratio (e.g., lower signal, higher noise). Moreover, it is advantageous to combine thermal-based imagery (e.g., frames with a dominant thermal component) with reflective-based imagery (e.g., frames with a dominant reflective component) to complement the strengths of each type of frame. Depending on the temperature of the scene or target, the thermal or reflective component of each of the bands' frames may be dominant. For example, with normal (ambient) earth temperatures, the USWIR band is dominated by the thermal component. With combustive or very hot temperatures (e.g., burning or high-temperature electrical arcing), the USWIR and the LSWIR bands are dominated by the thermal component. With artificial or man-made light (e.g., streetlamps, etc.), the USWIR thermal component is significantly less than the reflective component. Accordingly, combining reflective or thermal-based MWIR frames with other frames having thermal-based dominance or reflective-based dominance, respectively, may result in imagery having complementary strengths from each type of frame.

The imaging system and method for providing resolution on demand may be implemented using a single focal plane array, as in FIG. 1, two or more focal plane arrays, as in FIG. 2, may adapt to ambient radiance for providing optimum spatial resolution, in addition to other various factors, and may be implemented with a MEO satellite system including nighttime imagery capabilities, as in FIG. 7. The system and method herein may also be adapted to an uncooled LWIR wide field of view system, or a coarse resolution uncooled VNIR or SWIR cued illuminator with a very small aperture.

Therefore, there is presented an imaging system and method for providing resolution on demand. In an exemplary embodiment, the imaging system and method herein provide high-resolution imagery that measures upwelling radiance and adapts sensor settings to collect high-resolution imagery if there is ample upwelling radiance and/or illuminates regions of interest to provide sufficient illumination if there is insufficient upwelling radiance. The imaging system and method therefore adapt to the amount of upwelling radiance and provide additional illumination to regions of interest where that ambient level is insufficient to collect higher resolution imagery than would be possible without the illumination. The imaging system and method further provides fused imagery including image frames collected without illumination and image frames that are collected using illumination.

What is claimed is:

1. A method of providing an image of a scene utilizing imaging optics, wherein radiation from the scene impinges on at least one focal plane, the method comprising:
   sampling a first spectral band to obtain an initial image frame;
   determining at least one region of interest of the scene from the initial image frame, each of the at least one region of interest associated with a mean signal level;
   illuminating the at least one region of interest with at least one illuminator when the mean signal level of the at least one region of interest is at or below a respective threshold of a first plurality of thresholds to increase spatial resolution in the at least one region of interest, the at least one region of interest being illuminated in accordance with the mean signal level and one or more of an illuminator power and an illuminator agility;
   collecting at least one illuminated image frame in at least a second spectral band; and
   generating at least one image to be displayed from at least the at least one illuminated image frame.

2. The method of claim 1, wherein the at least one illuminated image frame is collected over the at least one region of interest.

3. The method of claim 1, wherein the first spectral band comprises a medium-wave infrared spectral band.

4. The method of claim 1, wherein the first spectral band comprises an upper short-wave infrared spectral band.

5. The method of claim 1, wherein the at least one image is generated by combining at least two image frames.

6. The method of claim 5, wherein the image to be displayed is a composite image.

7. The method of claim 5, wherein the image to be displayed is a band ratio image.

8. The method of claim 5, further comprising:
   determining a first band mean signal level from the initial image frame;
   when the first band mean signal level is above a first threshold:
      sampling sub-bands in a first plurality of sub-bands to obtain mean signal levels for each of the sub-bands; and
      collecting at least one image frame in each of the sampled sub-bands for which a corresponding mean signal level is above a second threshold.

9. The method of claim 5, further comprising:
   sampling the second spectral band to obtain a second band mean signal level;
   collecting at least one second band image frame when the second band mean signal level is at or below a third threshold;
   when the second band mean signal level is above the third threshold:
      sampling sub-bands in the second spectral band to obtain mean signal levels for each of the sub-bands;
      collecting at least one image frame in each of the sampled sub-bands for which a corresponding mean signal level is above a fourth threshold.

10. The method of claim 5, further comprising:
    determining a first band mean signal level from the initial image frame;
    when the first band mean signal level is above a first threshold:
       sampling successively narrower sub-bands in the first spectral band to obtain mean signal levels for the successively narrower sub-bands, each of the mean signal levels corresponding to a respective one of the successively narrower sub-bands, until at least one of the mean signal levels is at or below a respective threshold of a second plurality of thresholds; and
       collecting at least one image frame in each of the sampled sub-bands for which the corresponding mean signal level is above the respective threshold of the second plurality of thresholds.

11. The method of claim 10, wherein the successively narrower sub-bands comprise at least a portion of a long-wave infrared sub-band.

12. The method of claim 10, wherein the successively narrower sub-bands in the first spectral band comprises at least a portion of a short-wave infrared sub-band.

13. The method of claim 10, further comprising:
    determining a minimum integration time to collect the at least one image frame in the sampled sub-bands from the corresponding one of the mean signal levels.

14. The method of claim 10, further comprising:
    when the first band mean signal level is at or below the first threshold:
    collecting at least one image frame in the first spectral band.

15. The method of claim 10, further comprising:
    determining a first band minimum integration time to obtain the at least one image frame in the first spectral band from the first band mean signal level.

16. The method of claim 1, further comprising:
adjusting the imaging optics until a threshold signal level or a threshold edge contrast ratio has been reached.

17. The method of claim 16, wherein the imaging optics is adjusted until the threshold signal level or the threshold edge contrast ratio has been reached with respect to at least one sub-band of the first and second spectral bands.

18. The method of claim 16, wherein the imaging optics is adjusted by increasing or decreasing a focal length of a telescope of the imaging optics to increase effective Q, where $$Q = \frac{\lambda F/\#}{P_m},$$

and λ is center wavelength, F/# is a focal ratio of the telescope, and $P_m$ is metric pixel pitch.

19. The method of claim 18, further comprising:
correcting geometric aberrations caused by telescope errors or pointing motion when Q is greater than 2.

20. The method of claim 1, wherein the at least one region of interest is determined by shapes of objects, spectral signatures, temperature, motion, previously obtained image frames, external cues, or a combination thereof.

21. The method of claim 1, wherein the at least one focal plane comprises two focal planes, one of the focal planes corresponding to a range of frequencies of about the first spectral band.

22. The method of claim 1, wherein the at least one focal plane comprises two focal planes, one of the focal planes corresponding to a range of frequencies of about the second spectral band.

23. The method of claim 1, wherein at least one sub-band of a second plurality of sub-bands comprises at least portions of red, green and blue sub-bands.

24. The method of claim 1, further comprising:
generating a series of images to be displayed during corresponding frame times in accordance with a frame rate.

25. The method of claim 1, wherein the at least one illuminator comprises at least one laser.

26. The method of claim 25, wherein the at least one laser is a coherent laser, and collects synthetic aperture data.

27. The method of claim 1, wherein the at least one illuminated image frame comprises three-dimensional image data.

28. The method of claim 1, further comprising:
determining at least one sub-region of the at least one region of interest to be illuminated from the at least one image frame collected in the second spectral band when the at least one image frame collected in the second spectral band has been illuminated using a first illuminator of the at least one illuminator;
illuminating the at least one sub-region with at least one illuminator other than the first illuminator, wherein the at least one illuminator other than the first illuminator operates at a wavelength smaller than the first illuminator; and
collecting at least one image frame in the at least one sub-region in at least a sub-band of the second spectral band.

29. The method of claim 1, wherein the illuminating the at least one region of interest further comprises balancing an available collection time and the illuminator power according to an ambient light level.

30. A method of providing an image of a scene utilizing imaging optics, wherein radiation from the scene impinges on at least one focal plane, the method comprising:
sampling a first spectral band to obtain an initial image frame;
determining at least one region of interest of the scene from the initial image frame, each of the at least one region of interest associated with a mean signal level;
illuminating the at least one region of interest with at least one illuminator when the mean signal level of the at least one region of interest is at or below a respective threshold of a first plurality of thresholds, the at least one region of interest being illuminated in accordance a power threshold indicating a minimum illuminator power and agility necessary to illuminate the at least one region of interest;
collecting at least one illuminated image frame in at least a second spectral band;
generating at least one image to be displayed from at least the at least one illuminated image frame;
determining an optimal path to illuminate the at least one region of interest based on a prioritized scheduling algorithm; and
illuminating the at least one region of interest in accordance with the optimal path.

31. The method of claim 30, wherein the prioritized scheduling algorithm determines a minimum integration time to collect the at least one illuminated image frame.

32. An imaging system comprising:
at least one focal plane for providing images of a scene;
a spectral selector for transmitting a first spectral band, a second spectral band or portions thereof to the at least one focal plane;
at least one illuminator for illuminating at least one region of interest of the scene;
a cueing controller for sampling a first spectral band to obtain an initial image frame, determining at least one region of interest of the scene from the initial image frame, each of the at least one region of interest associated with a mean signal level, illuminating the at least one region of interest with at least one illuminator when the mean signal level of the at least one region of interest is at or below a respective threshold of a first plurality of thresholds to increase spatial resolution in the at least one region of interest, the at least one region of interest being illuminated in accordance with the mean signal level and one or more of an illuminator power and an illuminator agility, collecting at least one illuminated image frame in at least a second spectral band; and
a data combiner for generating at least one image to be displayed from at least the at least one illuminated image frame.

33. The imaging system of claim 32, wherein the at least one illuminated image frame is collected over the at least one region of interest.

34. The imaging system of claim 32, wherein the imaging optics is adjusted until a threshold signal level or a threshold edge contrast ratio has been reached.

35. The imaging system of claim 34, wherein the imaging optics is adjusted until the threshold signal level or the threshold edge contrast ratio has been reached with respect to at least one sub-band of the first and second spectral bands.

36. The imaging system of claim 34, wherein the imaging optics is adjusted by increasing or decreasing a focal length of a telescope of the imaging optics to increase effective Q, where $$Q = \frac{\lambda F/\#}{P_m},$$

and λ is center wavelength, F/# is a focal ratio of the telescope, and $P_m$ is metric pixel pitch.

37. The imaging system of claim 36, wherein the data combiner corrects geometric aberrations caused by telescope errors or pointing motion when Q is greater than 2.

38. The imaging system of claim 32, wherein the at least one image is generated by combining at least two image frames.

39. The imaging system of claim 38, wherein the cueing controller further collects at least two image frames in at least two sub-bands of the second spectral band.

40. The imaging system of claim 38, wherein the cueing controller further determines a first band mean signal level from the initial image frame, and when the first band mean signal level is above a second threshold: samples sub-bands in a first plurality of sub-bands to obtain mean signal levels for each of the sub-bands, and collects at least one image frame in each of the sampled sub-bands for which a corresponding mean signal level is above a third threshold.

41. The imaging system of claim 38, wherein the cueing controller further samples the second spectral band to obtain a second band mean signal level, collects at least one second band image frame when the second band mean signal level is at or below a third threshold, when the second band mean signal level is above the third threshold: samples sub-bands in the second spectral band to obtain mean signal levels for each of the sub-bands, and collects at least one image frame in each of the sampled sub-bands for which a corresponding mean signal level is above a fourth threshold.

42. The imaging system of claim 38, wherein the cueing controller further determines a first band mean signal level from the initial image frame, and when the first band mean signal level is above a first threshold: samples successively narrower sub-bands in the first spectral band to obtain mean signal levels for each of the successively narrower sub-bands until at least one of the mean signal levels each corresponding to one of the successively narrower sub-bands is at or below a respective threshold of a second plurality of thresholds, and collects at least one image frame in each of the sampled sub-bands for which a corresponding mean signal level is above the respective threshold of the second plurality of thresholds.

43. The imaging system of claim 38, wherein the cueing controller further determines an optimal path to illuminate the at least one region of interest based on a prioritized scheduling algorithm, and commands the at least one illuminator to illuminate the at least one region of interest in accordance with the optimal path.

44. The imaging system of claim 32, wherein the at least one focal plane comprises two focal planes, one of the focal planes corresponding to a range of frequencies substantially equivalent to the first spectral band.

45. The imaging system of claim 32, wherein the at least one focal plane comprises two focal planes, one of the focal planes corresponding to a range of frequencies substantially equivalent to the second spectral band.

46. The imaging system of claim 32, wherein the cueing controller further generates a series of images to be displayed during corresponding frame times in accordance with a frame rate.

47. The imaging system of claim 32, wherein the at least one illuminator comprises at least one laser.

48. The imaging system of claim 47, wherein the at least one laser is a coherent laser, and collects synthetic aperture data.

49. The imaging system of claim 32, wherein the at least one illuminated image frame comprises three-dimensional image data.

50. The imaging system of claim 32, wherein the cueing controller further determines at least one sub-region of the at least one region of interest to be illuminated from the at least one image frame collected in the second spectral band when the at least one image frame collected in the second spectral band has been illuminated using a first illuminator of the at least one illuminator, illuminates the at least one sub-region with at least one other illuminator other than the first illuminator, wherein the at least one other illuminator other than the first illuminator operates at a wavelength smaller than the first illuminator, and collects at least one image frame in the at least one sub-region in at least a sub-band of the second spectral band.

51. The imaging system of claim 32, wherein the cue controller balances an available collection time and the illuminator power according to an ambient light level.

* * * * *